US009086914B2

(12) United States Patent
Bolohan et al.

(10) Patent No.: US 9,086,914 B2
(45) Date of Patent: *Jul. 21, 2015

(54) SYSTEM AND METHOD FOR REDUCING STARTUP COST OF A SOFTWARE APPLICATION

(75) Inventors: Matthew J. Bolohan, Kitchener (CA); Robert J. Kroeger, Waterloo (CA); Aleksandr V. Kennberg, Waterloo (CA)

(73) Assignee: Google Inc., Mountain View, CA (US)

( * ) Notice: Subject to any disclaimer, the term of this patent is extended or adjusted under 35 U.S.C. 154(b) by 21 days.

This patent is subject to a terminal disclaimer.

(21) Appl. No.: 13/569,002

(22) Filed: Aug. 7, 2012

(65) Prior Publication Data

US 2012/0303756 A1   Nov. 29, 2012

Related U.S. Application Data

(63) Continuation of application No. 12/418,444, filed on Apr. 3, 2009, now Pat. No. 8,260,876.

(51) Int. Cl.
*G06F 15/16* (2006.01)
*G06F 9/48* (2006.01)

(52) U.S. Cl.
CPC .................................. *G06F 9/4843* (2013.01)

(58) Field of Classification Search
CPC ... G06F 9/4856; H04L 65/1083; H04L 67/10; H04L 67/148; H04L 67/18
USPC ............ 709/217; 370/338, 352; 379/338, 352
See application file for complete search history.

(56) References Cited

U.S. PATENT DOCUMENTS

| 5,497,379 | A | * | 3/1996 | Whetsel ........................ 714/731 |
| 5,913,060 | A | * | 6/1999 | Discavage ..................... 719/310 |
| 6,633,547 | B1 | * | 10/2003 | Akatsu et al. ................. 370/255 |
| 6,964,008 | B1 | | 11/2005 | Van Meter, III | |

(Continued)

FOREIGN PATENT DOCUMENTS

| EP | 1591890 A2 | 11/2005 |
| JP | H1063524 A | 3/1998 |

(Continued)

OTHER PUBLICATIONS

Kircher, "Lazy Acquisition", Proceedings of the 6th European Conference on Pattern Languages of Programs 2001, Jan. 1, 2002, pp. 1-11.

(Continued)

*Primary Examiner* — Tesfay Yohannes

(57) ABSTRACT

A computing device has one or more processors and memory storing programs executed by the one or more processors. The computing device initializes a main application on a first thread. The main application has a first synchronous connection with a target application. After the main application performs one or more operations at the target application through the first synchronous connection, the computing device initializes an assistant process on a second thread. The assistant process has a second synchronous connection with the target application and an asynchronous connection with the main application. After receiving a request from the main application through the asynchronous connection, the assistant process performs one or more operations at the target application through the second synchronous connection.

17 Claims, 15 Drawing Sheets

(56) References Cited

U.S. PATENT DOCUMENTS

| | | |
|---|---|---|
| 7,092,703 B1 | 8/2006 | Papineau |
| 7,366,894 B1* | 4/2008 | Kalimuthu et al. ............ 713/153 |
| 7,900,005 B2 | 3/2011 | Kotsovinos et al. |
| 8,234,338 B1* | 7/2012 | Dagum et al. ................. 709/206 |
| 8,432,562 B2* | 4/2013 | Ando et al. ................... 358/1.15 |
| 2001/0044758 A1* | 11/2001 | Talib et al. ....................... 705/27 |
| 2002/0042910 A1 | 4/2002 | Baumeister et al. |
| 2003/0074526 A1 | 4/2003 | Kanamaru et al. |
| 2003/0187957 A1 | 10/2003 | Huang et al. |
| 2004/0049693 A1 | 3/2004 | Douglas |
| 2004/0088710 A1* | 5/2004 | Ronkka et al. ................. 718/107 |
| 2004/0163083 A1 | 8/2004 | Wang et al. |
| 2005/0044197 A1* | 2/2005 | Lai ................................ 709/223 |
| 2006/0230408 A1 | 10/2006 | Frigo et al. |
| 2007/0033569 A1 | 2/2007 | Davidson et al. |
| 2007/0053344 A1* | 3/2007 | Liukkonen et al. ............ 370/352 |
| 2007/0263007 A1 | 11/2007 | Robotham et al. |
| 2007/0271309 A1 | 11/2007 | Witriol et al. |
| 2007/0271565 A1 | 11/2007 | Tirumalai et al. |
| 2008/0037721 A1 | 2/2008 | Yao et al. |
| 2008/0155118 A1* | 6/2008 | Glaser et al. ................... 709/238 |
| 2008/0247278 A1* | 10/2008 | Walker et al. ................. 368/206 |
| 2008/0254796 A1* | 10/2008 | Kim et al. ...................... 455/436 |
| 2009/0100438 A1 | 4/2009 | Hinton et al. |
| 2009/0137206 A1* | 5/2009 | Sherman et al. ............... 455/41.2 |
| 2009/0175591 A1* | 7/2009 | Gondhalekar et al. .......... 386/83 |
| 2010/0008338 A1* | 1/2010 | Tsfati et al. .................... 370/338 |
| 2010/0031153 A1 | 2/2010 | Ortwein et al. |
| 2010/0228737 A1 | 9/2010 | Riemers |
| 2010/0241946 A1* | 9/2010 | Ofek et al. ..................... 715/231 |
| 2011/0069634 A1* | 3/2011 | Hajiaghayi et al. ............ 370/254 |
| 2011/0178940 A1* | 7/2011 | Kelly et al. .................... 705/321 |
| 2012/0174225 A1* | 7/2012 | Shyamsunder et al. ........ 726/24 |
| 2013/0073387 A1* | 3/2013 | Heath ........................ 705/14.53 |
| 2013/0226925 A1* | 8/2013 | Carbonell et al. ............. 707/740 |

FOREIGN PATENT DOCUMENTS

| | | |
|---|---|---|
| JP | 2000047887 A | 2/2000 |
| JP | 2005056416 A | 3/2005 |
| JP | 2006163714 A | 6/2006 |

OTHER PUBLICATIONS

PCT Search Report / Written Opinion, PCT/US2010/029564, Jul. 9, 2010, 8 pgs.

Examination Report No. 1, dated Oct. 7, 2014 for related Australian Patent Application No. 2010232613.

Office Action dated Feb. 25, 2014 for related Japanese Application No. 2012-503690 dated Apr. 1, 2010.

Notice of Allowance dated May 7, 2012 for related U.S. Appl. No. 12/418,444 dated Apr. 3, 2009.

Non-Final Office Action dated Jun. 23, 2011 for related U.S. Appl. No. 12/418,444 dated Apr. 3, 2009.

Office Action dated Jul. 14, 2014 for related Japanese Application No. 2012-503690 dated Apr. 1, 2010.

* cited by examiner

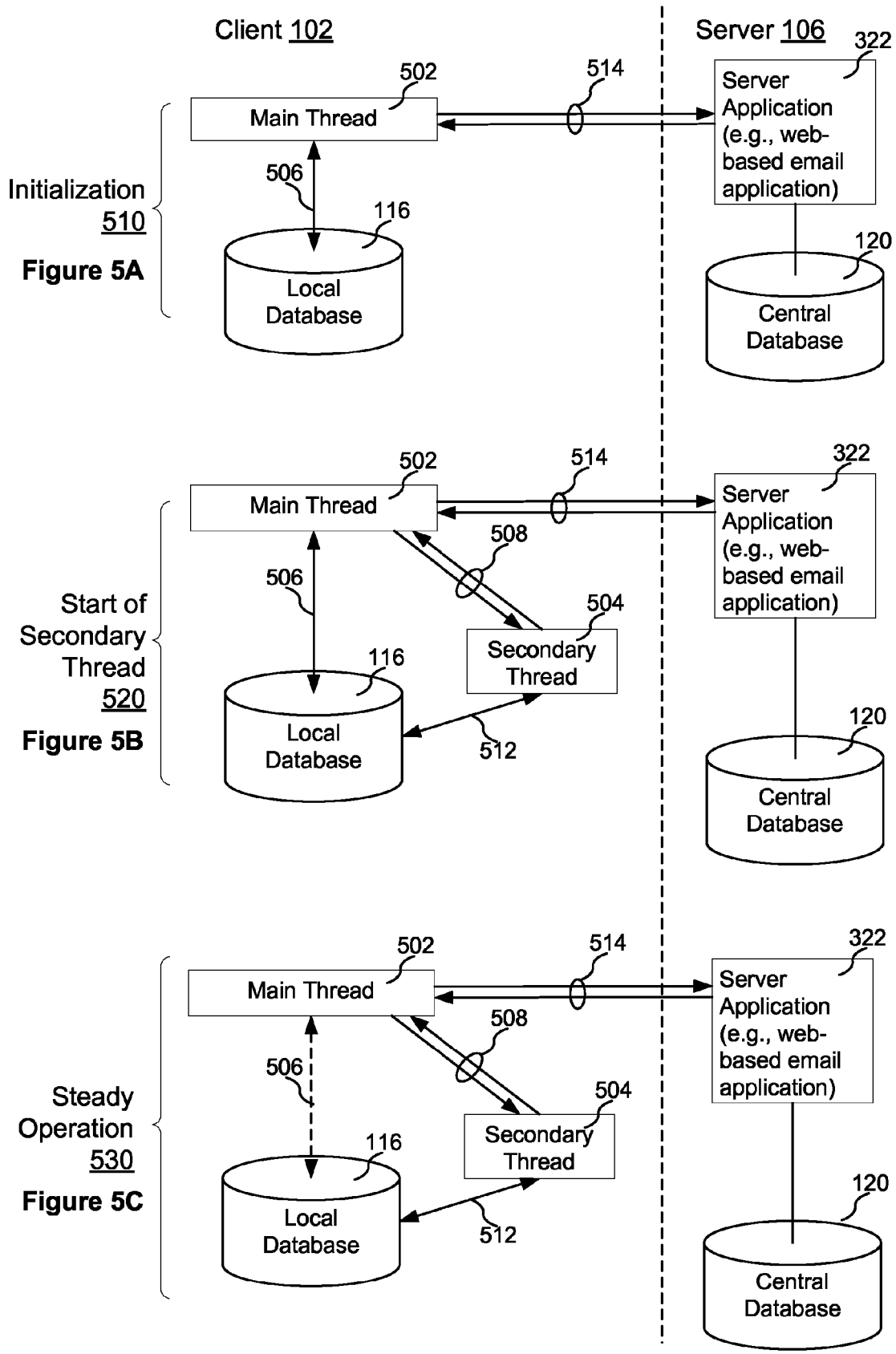

SYSTEM AND METHOD FOR REDUCING STARTUP COST OF A SOFTWARE APPLICATION

This application is a continuation of U.S. patent application Ser. No. 12/418,444, filed Apr. 3, 2009, the entire content of which is hereby incorporated by reference in its entirety.

RELATED APPLICATIONS

This application relates to U.S. patent application Ser. No. 12/418,470, filed Apr. 3, 2009, "Tracking Remote Browser Crashes via Cookies," which is hereby incorporated by reference in its entirety.

This application relates to U.S. patent application Ser. No. 12/418,460, filed Apr. 3, 2009, "Reduced Bandwidth Cache Coherency via Checksum Exchange," which is hereby incorporated by reference in its entirety.

This application relates to U.S. patent application Ser. No. 12/418,483, filed Apr. 3, 2009, "Architectural Pattern for Persistent Web Application Design," which is hereby incorporated by reference in its entirety.

TECHNICAL FIELD

The disclosed embodiments relate generally to the field of client-server computer network systems, and in particular, to systems and methods for reducing the startup cost of a software application.

BACKGROUND

The startup of a software application on a computer typically requires the computer to load the application into memory, retrieve data from local and/or remote sources, and store the data at designated locations in the memory. A user is often unable to use the application until the application is fully initialized and ready to process user instructions. Very often, this initialization process may take a long period of time, during which time the user cannot do anything but wait. This situation could have a significant impact on the user experience where the computer is a portable device, such as a mobile phone, that has limited resources due to one or more of restricted network bandwidth, memory space, and processor throughput.

SUMMARY

In some embodiments, a computing device has one or more processors and memory storing programs executed by the one or more processors. The computing device initializes a main application on a first thread. The main application has a first synchronous connection with a target application. After the main application performs one or more operations at the target application through the first synchronous connection, the computing device initializes an assistant process on a second thread. The assistant process has a second synchronous connection with the target application and an asynchronous connection with the main application. After receiving a request from the main application through the asynchronous connection, the assistant process performs one or more operations at the target application through the second synchronous connection.

In some embodiments, a computer system includes one or more processors; memory; and one or more programs. The one or more programs are stored in the memory and configured to be executed by the one or more processors. The one or more programs include: instructions for initializing a main application on a first thread, wherein the main application has a first synchronous connection with a target application; instructions for initializing an assistant process on a second thread after the main application performs one or more operations at the target application through the first synchronous connection, wherein the assistant process has a second synchronous connection with the target application and an asynchronous connection with the main application; and instructions for receiving, at the assistant process, a request from the main application through the asynchronous connection; and instructions for performing one or more operations at the target application through the second synchronous connection in response to the request.

In some embodiments, a computer readable storage medium includes one or more computer programs embedded therein. The one or more computer programs comprise instructions, which, when executed by a computer system, cause the computer system to: initialize a main application on a first thread, wherein the main application has a first synchronous connection with a target application; initialize an assistant process on a second thread after the main application performs one or more operations at the target application through the first synchronous connection, wherein the assistant process has a second synchronous connection with the target application and an asynchronous connection with the main application; and receive, at the assistant process, a request from the main application through the asynchronous connection; and perform one or more operations at the target application through the second synchronous connection in response to the request.

BRIEF DESCRIPTION OF THE DRAWINGS

FIGS. 5A-5C are block diagrams illustrating the startup process of a multi-thread software application in a client-server distributed system in accordance with some embodiments.

Like reference numerals refer to corresponding parts throughout the drawings.

DESCRIPTION OF EMBODIMENTS

Figure 1:
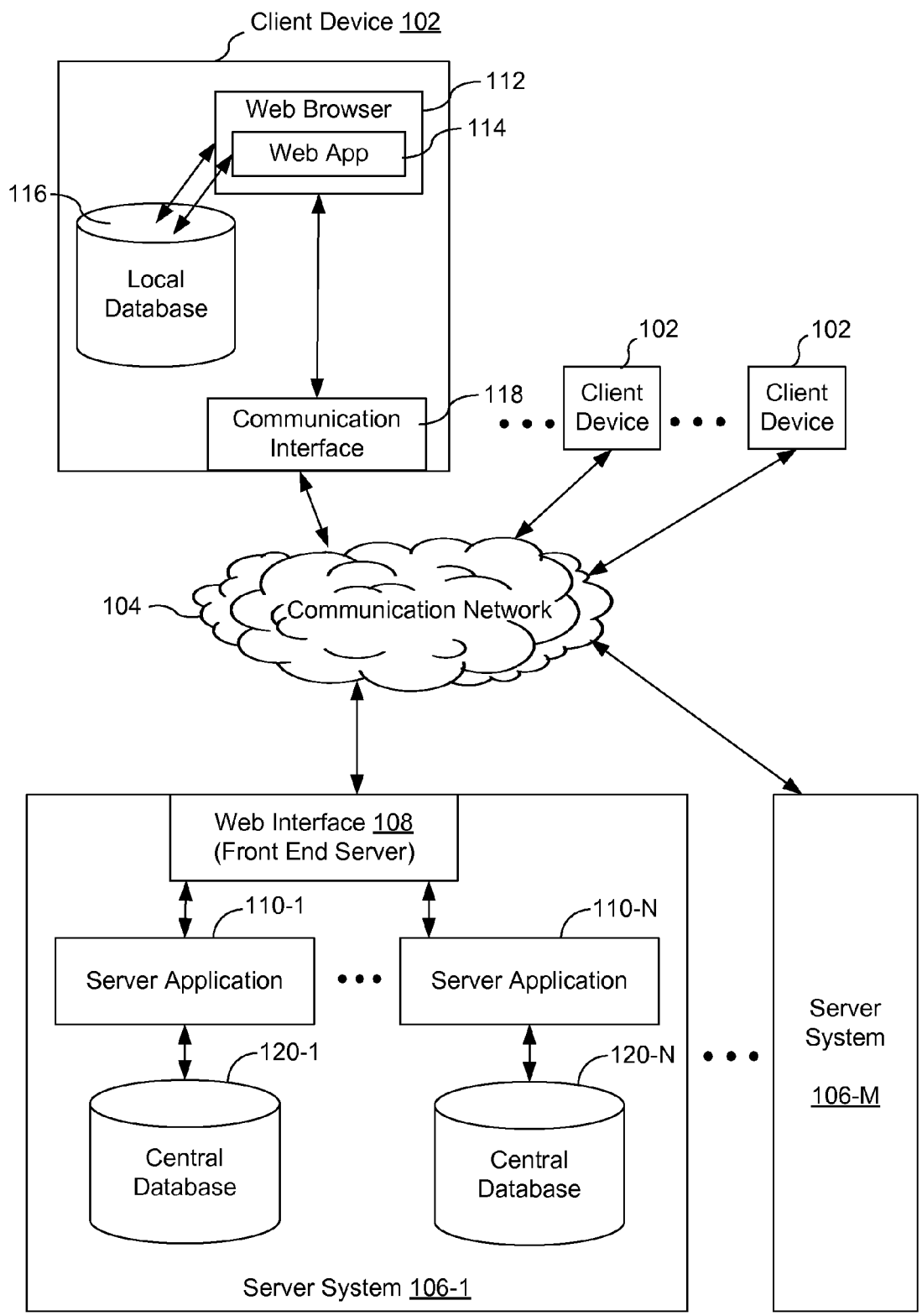
FIG. 1 is a block diagram illustrating the infrastructure of a client-server distributed system in accordance with some embodiments.

FIG. 1 is a block diagram illustrating the infrastructure of a client-server distributed system according to some embodiments. The distributed system includes a plurality of client devices 102 and a plurality of server systems 106. These components are linked together through one or more communication networks 104 (e.g., the Internet, other wide area networks, local area networks, etc.) so that the various components can communicate with each other. In some embodiments, each of the server systems 106 is a single server. In other embodiments a server system 106 includes a plurality of servers such as a web interface (front end server) 108, one or more server applications 110 (which may be implemented on one or more servers) and one or more central databases 120 which are connected to each other through a local area network (LAN) and exchange information with the client devices 102 through a common interface (e.g., one or more server systems, also called front end servers). In embodiments having a plurality of server systems 106, the server systems 106 may be connected to each other through a local area network (LAN) or other communication network.

A client device 102 includes a client application such as a web browser 112. A user can use the web browser 112 to access one or more web applications 114 from the server systems 106. The web browser 112 and the web application 114 within the web browser 112 have access to data items stored in a local database 116 on the client 102. In some embodiments, accessing a web application 114 includes downloading a program from a server system 106 and storing data in a local database 116 for use by the web application 114. The client device 102 (sometimes called the "client device" or "client computer") may be any computer or similar device that is capable of receiving data from and sending requests (e.g., web application data requests, search queries, information requests, login requests, etc.) to the server system 106. Examples of client devices include, without limitation, desktop computers, notebook computers, tablet computers, mobile devices such as mobile phones and personal digital assistants, and set-top boxes. In the present application, the term "web application" means virtually any interactive application that provides the user with access to content received from a server system 106. Requests from a client device 102 are conveyed to a respective server system 106 using the HTTP protocol, using http requests through a communication interface 118 or other similar network communication protocols.

A server system 106 includes at least a web interface (front end server) 108, a server application 110 and a central database 120. The web interface 108 parses requests from the client devices 102, fetches corresponding web applications provided by the server application 110 and returns the web applications to the requesting client device(s) 102. Depending upon their respective locations in the topology of the client-server system, the web interface is implemented on a separate ("front end server") 108 and the server application is implemented on a separate ("back end server") 110. In the present application, the terms "web interface" and "front end server" are used interchangeably. In some other embodiments, the front end server 108 and the back end server 110 are merged into one software application or one server system 106.

In some embodiments, the server systems 106 are deployed over multiple computers (represented by N application servers and N central databases in FIG. 1) so as to provide different types of services, such as email services, search engine services, map services, social networking services and the like. In some other embodiments, one individual type of service may also be distributed among multiple servers. For example, consider a system in which a server application 110-1 is a web-based email service (e.g., the Gmail email application). Data items such as: email messages, conversations (e.g., lists of email messages), thread lists (e.g., lists of conversations) and account information (e.g., user profiles, user preferences, and account history) may be stored in one or more central database(s) 120 that are accessible to the server application 110. Server applications 110 may be connected to one or more central databases 120. In some embodiments a single server application 110 may have access to a single central database 120 (such as where information stored in the central database is needed only by the single server applications), while in other embodiments multiple server applications 110 have access to a single central database 120 (such as where a small amount of information is used by a number of server applications 110 and the information is updated frequently), in other embodiments multiple server applications 110 may be connected to multiple central databases 120 (such as where a large amount of data is stored and needed by a large number of server applications 110).

Figure 2:
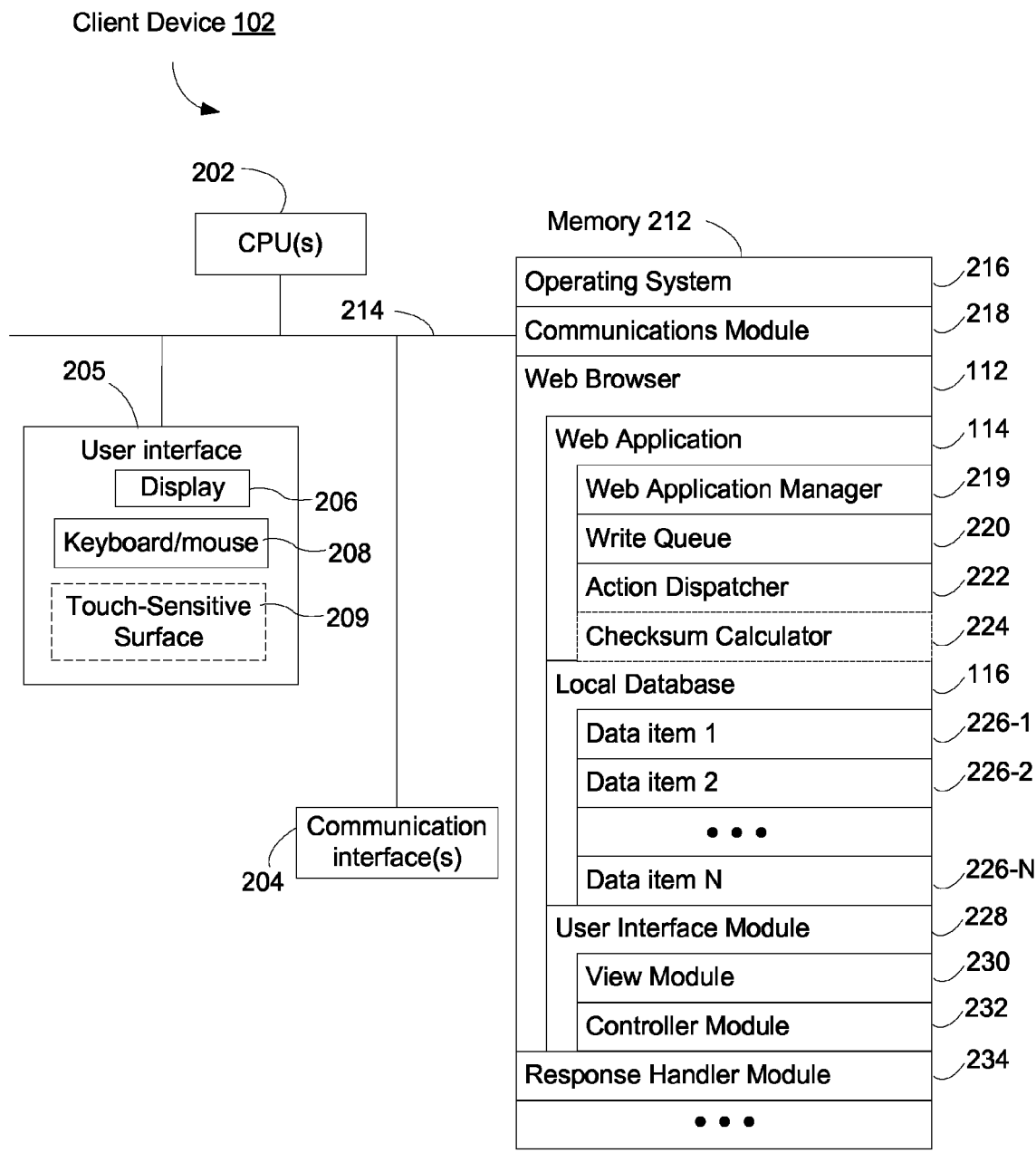
FIG. 2 is a block diagram illustrating the structure of an exemplary client system in accordance with some embodiments.

Attention is now directed to FIG. 2, which is a block diagram illustrating a computer system (e.g., client device 102) in accordance with one embodiment of the present invention. The client device 102 typically includes one or more processing units (CPUs) 202, one or more network or other communications interfaces 204, memory 212, and one or more communication buses 214 for interconnecting these components. The client device 102 optionally may include a user interface 205 comprising a display device 206 and a keyboard/mouse 208 (or, in some embodiments a touch-sensitive surface 209). Memory 212 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 212 may optionally include one or more storage devices remotely located from the CPU(s) 202. Memory 212, or alternately the non-volatile memory device(s) within memory 212, comprises a computer readable storage medium. In some embodiments, memory 212 or the computer readable storage medium of memory 212 stores the following programs, modules and data structures, or a subset thereof:

- an operating system 216 that includes procedures for handling various basic system services and for performing hardware dependent tasks;
- a communications module 218 that is used for connecting the client device 102 to other computers via the one or more communication interfaces 204 (wired or wireless) and one or more communication networks, such as the Internet, other wide area networks, local area networks, metropolitan area networks, and so on;
- a web browser 112, for receiving a user request for a web application 114, rendering the requested web application 114 on the display device 206 or other user interface device using a user interface module 228, and storing data items in a local database 116; in some embodiments, the web application 114, local database 116 and the user interface module execute within the web browser.

the one or more web applications 114 may include a web application manager 219 for coordinating operations within the web application 114, a write queue 220 for queuing operations from the web application manager 219, an action dispatcher 222 for writing to a local database 116 and (optionally) a checksum calculator 224 for calculating checksums on data items;

the local database 116 stores data items (e.g., 226-1. 226-2) received at the web application 114 from various servers systems 106;

the user interface module 228 includes a view module 230 for rendering the user interface and a controller module 232 for detecting user interaction events and passing along user interaction events to other modules; and a response handler module 234 for responding to communications from the server system by storing data items in the local database 116 and communicating information to the web application 114.

Although FIG. 2 shows a "client device 102" the client device described with reference to FIG. 2 is intended more as functional description of the various features which may be present in a client device 102 than as a structural schematic of the embodiments described herein. In practice, and as recognized by those of ordinary skill in the art, items shown separately could be combined and some items could be separated. For example, the client application (e.g., the web browser 112) may be integrated with the operating system 216 in some embodiments. In some embodiments, various functions of the client application (e.g., web browser 112) may be performed by two or more separate applications. In some embodiments, the local database 116, shown as part of the web browser 112, could be a local database accessible to a plurality of client applications on the client device.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 212 may store a subset of the modules and data structures identified above. Furthermore, memory 212 may store additional modules and data structures not described above.

Figure 3:
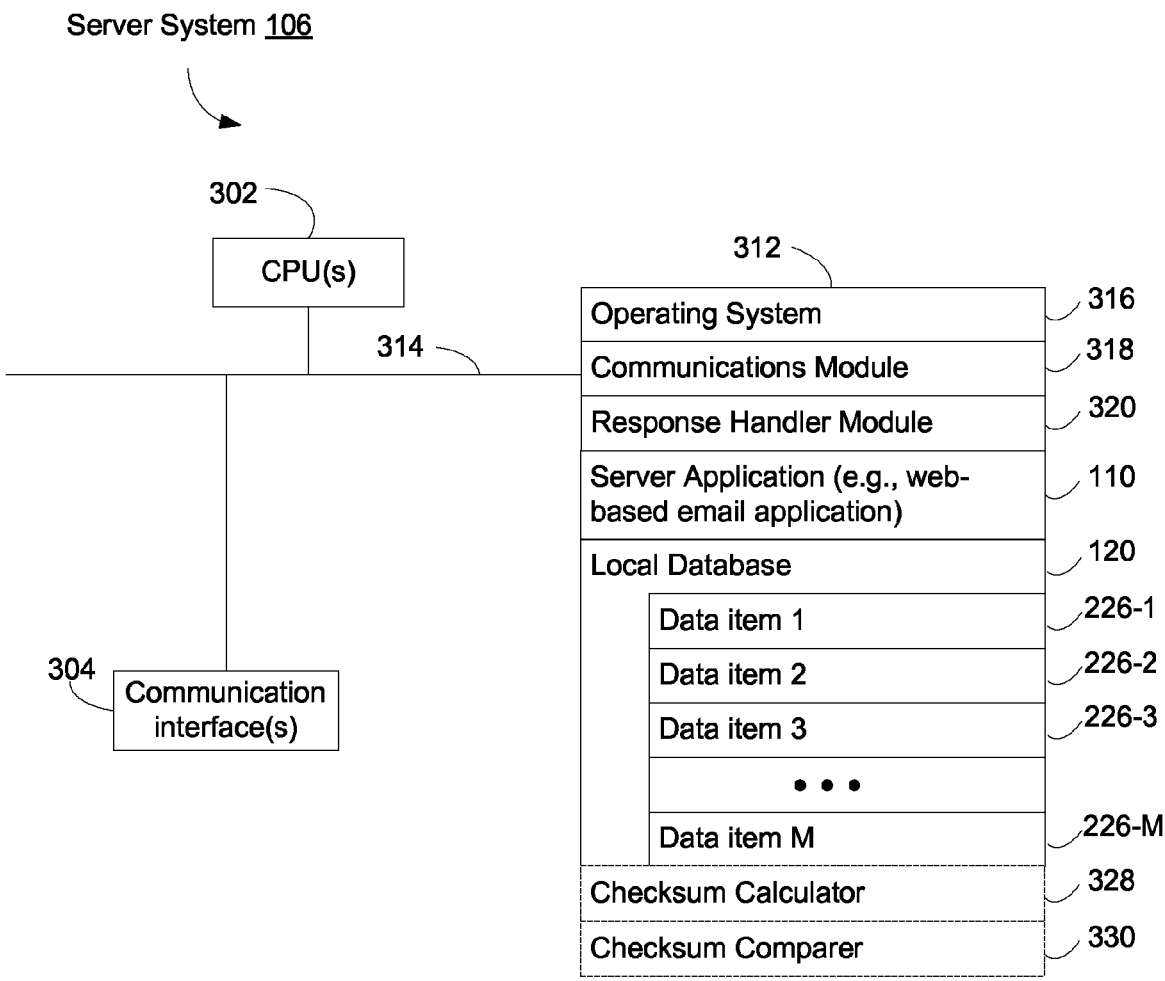
FIG. 3 is a block diagram illustrating the structure of an exemplary server system in accordance with some embodiments.

Attention is now directed to FIG. 3, which is a block diagram illustrating a server system 106 in accordance with one embodiment of the present invention. The server system 106 typically includes one or more processing units (CPUs) 302, one or more network or other communications interfaces 304, memory 312, and one or more communication buses 314 for interconnecting these components. Memory 312 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 312 may optionally include one or more storage devices remotely located from the CPU(s) 302. Memory 312, or alternately the non-volatile memory device(s) within memory 312, comprises a computer readable storage medium. In some embodiments, memory 312 or the computer readable storage medium of memory 312 stores the following programs, modules and data structures, or a subset thereof:

an operating system 316 that includes procedures for handling various basic system services and for performing hardware dependent tasks;

a communication module 318 that is used for connecting the server system 106 to other computers via the one or more communication interfaces 304 (wired or wireless) and one or more communication networks, such as the Internet, other wide area networks, local area networks, metropolitan area networks, and so on;

a response handler module 320 that passes communications between the server system 106 and client devices 102, the response handler module can be used in conjunction with or instead of a separate front end server (108 in FIG. 1);

a server application 110 that prepares responses to requests that are received from the client device 102, in some embodiments the server application 110 sends the web application 114 to the client device 102;

a central database 120 for storing data items (e.g., 226-1, 226-2) associated with the server application 110 and/or the web application 114;

a checksum calculator (optional) 328 for calculating a checksum on a data item; and a checksum comparer (optional) 330 for comparing a checksum received from a web application with a checksum computed by the server system 106.

Although FIG. 3 shows a single server system 106, the server described in with reference to FIG. 3 is intended more as functional description of the various features which may be present in a server system than as a structural schematic of the embodiments described herein. In practice, and as recognized by those of ordinary skill in the art, items shown separately could be combined and some items could be separated. For example, some items shown separately in FIG. 3 could be implemented on single server, and single items could be implemented by one or more servers. The actual number and types of servers used to implement an server system 106 (FIG. 1) and how features are allocated among them will vary from one implementation to another, and may depend in part on the amount of data traffic that the system must handle during peak usage periods as well as during average usage periods.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 312 may store a subset of the modules and data structures identified above. Furthermore, memory 312 may store additional modules and data structures not described above.

Figure 4:
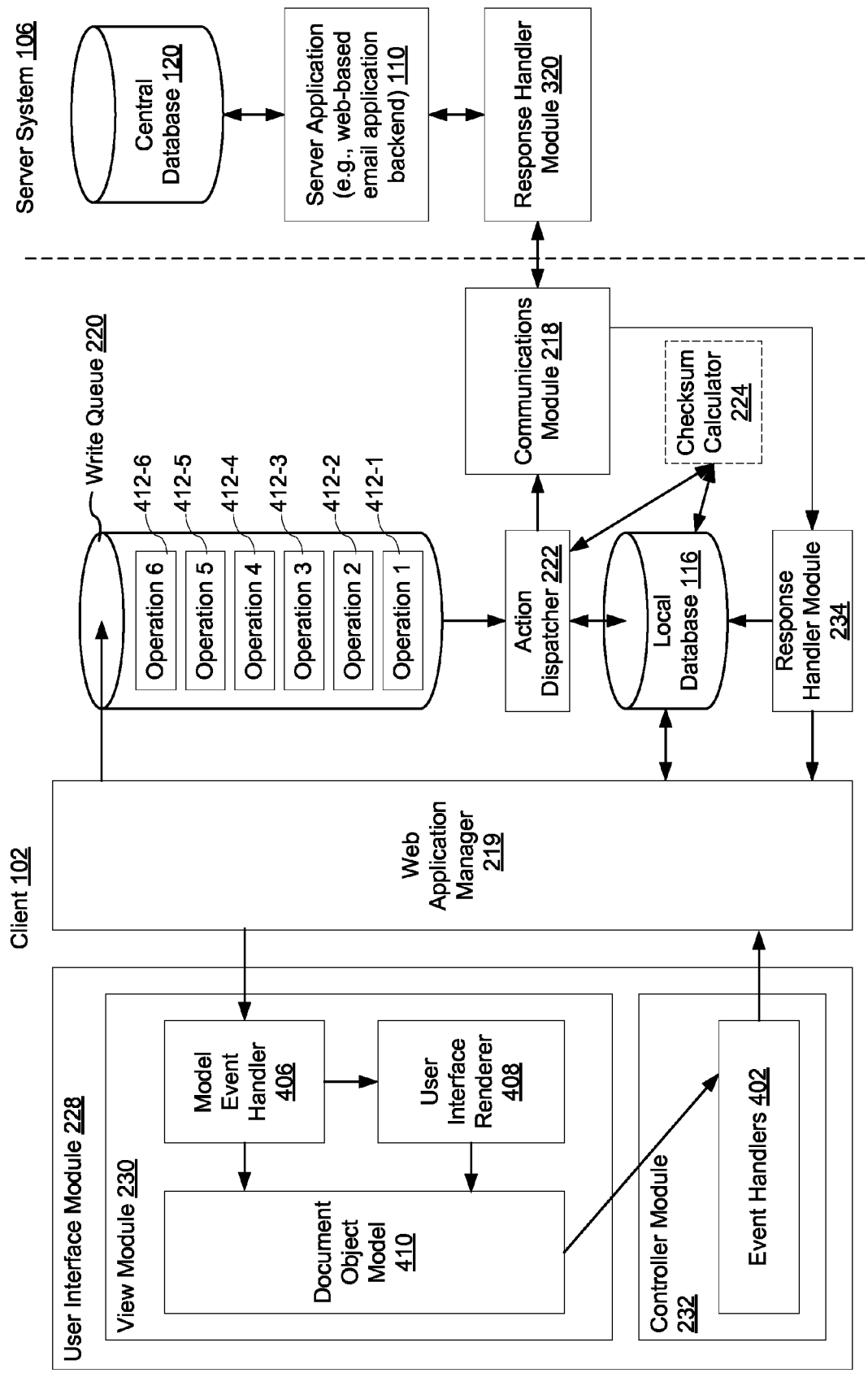
FIG. 4 is a block diagram illustrating the interrelation between components of the client-server distributed system in accordance with some embodiments.

Attention is now directed to FIG. 4, which illustrates the interrelation between components of a client-server distributed system in accordance with some embodiments. As shown in FIG. 4, the user interface module 228 includes a view module 230 for rendering the user interface (e.g., on the display 206 in FIG. 2), and a controller module 232 for detecting user interaction events (e.g., mouse clicks or keyboard inputs from keyboard/mouse 208 or touch sensitive surface 209 in FIG. 2) and passing the user interaction events to the web application manager 219. In some embodiments the controller module 232 is implemented as a set of event handlers 402 (e.g., click/touch event handlers), which handle clicks, touches and other user input. In some embodiments, initially all event handlers display activity, and send a request to the web application manager 219 (e.g., in some embodiments, a JavaScript in-memory model), which sends a model event back to the view module 230. In the view module 230, a model event handler 406 passes the event off to a user interface renderer 408 (e.g., a HTML renderer) and a document object model 410 or other application programmer interface for manipulating documents. The user interface renderer 408 sends rendered user interface elements to the document object model 410, which constructs a new model, displays the model (e.g., to the user) and passes the new model off to the controller module 232 to wait for additional events detected by the event handlers 402.

In some embodiments, when the web application manager 219 is configured to detect an event from the event handler 402 indicating an operation to be performed on one or more of the data items in the local database 116, the web application manager 219 sends the operation to the write queue 220. In some embodiments, operations 412-1, 412-2, 412-3, 412-4, 412-5, 412-6 are stored in the write queue 220 in the order in which they arrived at the write queue 220 (i.e., in these embodiments the write queue is a chronological record of requests from the web application manager 219). The web application manager maintains a list of callbacks into the user interface module 228, one for each operation (e.g., "Operation 1" 412-1) in the write queue, a flag indicating whether the callback has been called or not, and a counter for failed attempts to satisfy the operation (e.g., "Operation 1" 412-1). In some embodiments, the action dispatcher 222 is configured to send operations (e.g., "Operation 1" 412-1) from the write queue 220 to the local database 116, and to the communications module 218.

In some embodiments the action dispatcher 222 is configured to send operations to a checksum calculator. The checksum calculator computes the checksum of one or more data items stored in the local database 116. In some embodiments, the checksum is stored in the local database 116 along with the data item. If there was a previous checksum for the data item stored in the local database 116, the computed checksum replaces the stored checksum. In some embodiments, checksums are computed using the whole data item. A checksum can be computed in any of the standard mechanisms known in the art (e.g., the MD5 checksum algorithm (IETF RFC 1321) or SHA-1 (FIPS PUB 180-1) algorithm). In some embodiments, discussed in greater detail below with reference to FIGS. 8A-8D, checksums for a data item are used to determine whether the data item has been updated.

In some embodiments, the communications module 218 is configured to transmit the operations (e.g., "Operation 1" 412-1) received from the action dispatcher 222 to the response handler module 320 in the server system. In some embodiments the response handler module 320 is configured to pass off the operation to the server application 110. The server application 110 is, in some embodiments, configured to retrieve one or more data items from a central database 120 in response to receiving the request to perform the operation (e.g., using a unique identifier associated with the data item that was included in the request). In some embodiments, the server application 110 is configured to return the results (e.g., a data item and/or a checksum of a data item) of the operation to the response handler 320, which is configured to transmit the results to the client device 102. In some embodiments when the local database 116 is not synchronized (i.e., is not coherent) with the central database 120, the response includes a replacement data item or a component of a data item needed to bring the local database 116 back into coherence with the central database 116. In some embodiments, when the local database 116 is synchronized (i.e., coherent) with the central database 120, the response indicates that the data items in the local database 116 are up to date (e.g., the response does not include any data items or components of data items).

In some embodiments, the communications module 218 on the client device 102 passes off the results from the server application 110 to a response handler module 234 on the client device. In some embodiments the results of the operation are stored in the local database 116 and/or returned to the web application manager 219. In some embodiments the operation is a display operation and the data item is displayed to the user.

For example, consider a scenario where a user is viewing an email application on a mobile device and selects the header of the email to view the email. In this example, the request to view the email message on a mobile device is sent to the write queue 220 by the web application manager 219. If the action dispatcher 222 finds the email in the local database 116, then the email is sent to the web application manager 219 for display to the user. If the action dispatcher 222 does not find the email in the local database 116, then the request for the message is sent to a server system 106 with an email database 120 and the email from the central database 120 returned to the client device 102. In this embodiment, the email message is returned to the response handler 234, which stores the email in the local database 116 and passes it off to the web application manager 219 for display to the user.

Attention is now directed to FIGS. 5A-5C, which illustrate the startup process of a multi-thread software application in a client-server distributed system in accordance with some embodiments.

To reduce the startup cost at the client 102, the multi-thread software application divides the process into multiple stages as shown in FIGS. 5A-5C, respectively. At the initialization stage 510, the software application first launches a main application on a main thread 502. In some embodiments, the software application is the web-based email service on a portable device such as a mobile phone. The main application on the main thread is responsible for handling user interactions with the user interface of the service. In some embodiments, the main application is single-threaded. In some other embodiments, the main application is multi-threaded.

As shown in FIG. 5A, after initialization of the application, there is a synchronous connection 506 between the main application thread 502 and a local database 116. The local database 116 caches a predefined amount of data associated with the email service. A more detailed description of the local database is provided below in connection with FIG. 6B. Through the synchronous connection 506, the main application at the main thread 502 is able to perform operations on the local database 116 in a synchronous manner such as retrieving data records from the local database 116 and updating data records in the local database 116.

There is also an asynchronous connection 514 between the main thread 502 and the server application 322 at a remote server system 106. As part of a web-based software application, all the email messages rendered by the main application at the client 102 ultimately come from the server application 322, which manages the email messages in a central database 120 at the server side. A more detailed description of the server application 322 and the central database 120 is provided below in connection with FIGS. 6A and 7A-7B. As will be explained below, the main application uses the asynchronous connection 514 to retrieve data from the central database 120 if the data is not present in the local database 116.

In some embodiments, the initialization of the main application at the main thread 502 includes displaying a user interface at the client 102, retrieving a predefined amount of data from the local database 116, and populating the user interface with the retrieved data. For example, during the initialization of a web-based email service, the main application on the main thread 502 uses the synchronous connection 506 to retrieve the email messages associated with the inbox folder of a user's email account from the local database 116 because it is assumed that an average user of the email service is most interested in first viewing the unread messages in the inbox folder directed to the user. After retrieving the messages from the local database 116 through the synchronous connection 506, the main application uses the retrieved messages to populate the user interface associated with the email service to allow the user of the client 102 to interact with at least the messages in the inbox folder. Although the initialization of the main application as shown in FIG. 5A may not conclude in the startup of the entire email service, being able to access the unread messages in the inbox folder as quickly as possible can significantly improve an average user's experience with the email service.

Besides populating the inbox folder, the startup process of the email service may perform other tasks such as fetching email messages associated with other folders from the local database 116 and synchronizing the local database 116 with the central database 120. As a result, the completion of the entire startup process may involve a significant amount of data transmission between different components in the client 102 and between the client 102 and the server 106. If the main thread 502 is responsible for handling some of these tasks synchronously, it may not be able to bring up the user interface and get ready to receive the user instructions in a timely fashion. In addition, after initialization, the web application might need to perform ongoing tasks, such as accessing large data items in the database 116, rendering large graphics files, managing downloads across a network or a synchronization protocol, executing file reads or writes, or performing other computationally intensive tasks on the client device that, if performed synchronously by the main thread 502, could perceptibly slow operation of the web application and therefore harm the user experience. In some embodiments, at least some of these operations, which can be performed directly by the main thread 502, are delegated to one or more assistant processes running on secondary threads that can interact with the main thread asynchronously, thereby reducing the load on the main thread 502. Without these secondary threads, the main thread 502 would block progress of the web application due to the need to wait for a synchronous operation to complete and return a result.

Thus, in some embodiments, the initialization stage 510, which gives the user an impression that the email service is ready, is followed by the second stage 520, in which an assistant process is initialized on a secondary thread 504. As noted above, the purpose of the assistant process is to perform those synchronous tasks that, if performed by the main thread, would block progress of the web application. By deferring the start of the secondary thread 504, the latency caused by having the main thread 502 responsible for the entire startup process is avoided or at least significantly reduced. In addition, by deferring the start of the secondary thread 504 until after the main thread 502 has performed one or more synchronous operations associated with starting the web application, the cost of creating/initializing the secondary thread can be deferred until after the user is able to begin using the application. The cost of creating/initializing the secondary thread includes the time needed to fetch, parse and initialize the web application code, which can take as much as or more than one second depending on the mobile device and application. By avoiding this delay at startup, the user is able to start using the application almost immediately.

As shown in FIG. 5B, the main thread 502 spawns the secondary thread 504 after the main application at the main thread 502 concludes a transaction between the main thread 502 and the local database 116, e.g., populating the inbox folder of the email service. Note that the assistant process at the secondary thread 504 is generated to substitute the main application at the main thread 502 for communicating with the local database 116 and completing the remaining tasks of starting the web-based email service application. There is also a synchronous connection 512 between the secondary thread 504 and the local database 116. Through this connection 512, the assistant process can perform the same operations on the local database 116 that the main application can perform through the connection 506. In some embodiments, the assistant process is configured to complete the remaining tasks of initializing the web-based application left by the main application. In some other embodiments, the main application completes all the tasks associated with initializing the web-based application. Thus, the assistant process is primarily responsible for replacing the role of interacting with the local database 116 that was played by the main thread 502.

Figure 5D:
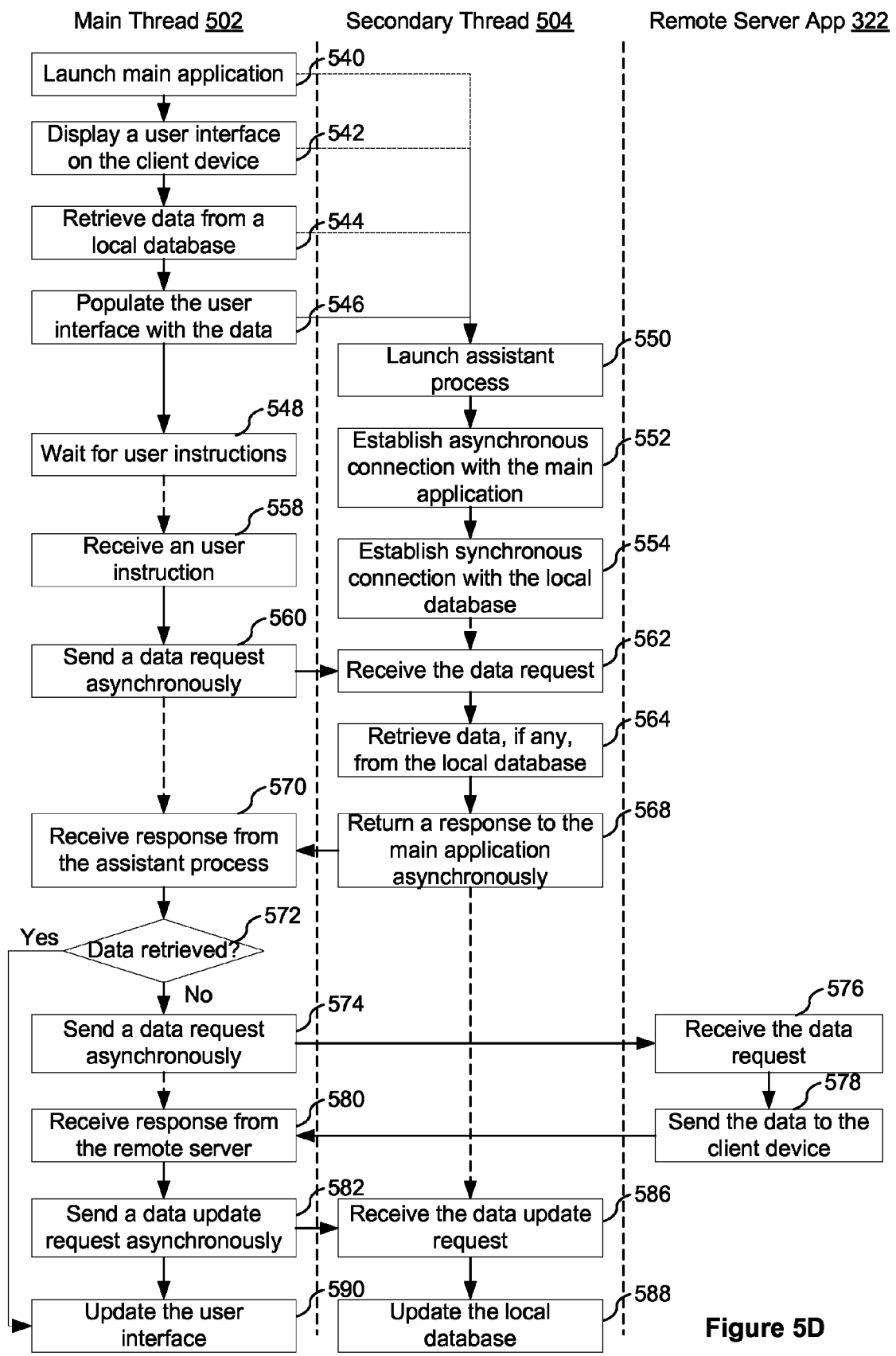
FIG. 5D is a flow diagram illustrating the interactions between the client and the server in the startup and subsequent operations for transferring data between a web-based software application on a client system and a server system in accordance with some embodiments.

As shown in FIG. 5C, there is an asynchronous connection 508 between the main thread 502 and the secondary thread 504. With the establishment of the synchronous connection 512, the main application no longer needs to perform operations on the local database 116 directly through the synchronous connection 506 as it did during the initialization stage 510. Rather, the entire application now transits into the stage 530 of steady operation. During the steady operation, the main application communicates with the assistant process at the secondary thread 504 through the asynchronous connection 508. A more detailed description of this communication is provided below in connection with FIG. 5D. As a result, in some embodiments, the synchronous connection 506 between the main thread 502 and the local database 116 is terminated or destroyed (as indicated by the dashed line in FIG. 5C). In some other embodiments, the synchronous connection 506 still exists but is deactivated.

Attention is now directed to FIG. 5D, which illustrates the interactions between the client and the server in the startup and subsequent operations for transferring data between a web-based software application on a client system and a server system in accordance with some embodiments.

Initially, the main application is launched (540) on the main thread 502. In some embodiments, the main application displays (542) a user interface on the client device, retrieves (544) data from a local database, and populates (546) the user interface with the retrieved data. For example, a web-based email service at this time is ready to respond to user interactions with the client device by displaying the email messages selected by the user through the user interface and receiving user-entered text through the user interface.

After performing the aforementioned operations, the main application enters an idle state and waits (548) for next user instructions. But to relieve the main application from the subsequent interactions with the local database, which may block the user from interacting with the client device, an assistant process is launched (550) on the secondary thread 504. In some embodiments, the assistant process may be launched earlier in time as indicated by the dashed lines in FIG. 5D as long as its launch does not seriously block the main application from responding to user instructions. Next, the assistant process establishes (552) an asynchronous connection with the main application and establishes (554) a synchronous connection with the local database. In some embodiments, at this point the assistant process/secondary thread 504, which is ready to handle database requests, returns a "ready" message to the main thread 502, after which the main thread hands off responsibility for local database operations to the assistant process/secondary thread 504 when it is safe to do so. In some embodiments, this is when the main thread is between synchronous database operations that it is handling.

Assume now that the main application subsequently receives (558) a user instruction to retrieve data from the local database. At this moment, the assistant process has been launched and the synchronous connection (506, FIG. 5C) between the main application and the local database may have been terminated. Thus, the main application sends (560) a data access request to the assistant process through the asynchronous connection between the main thread and the secondary thread. Upon receiving (562) the data access request, the assistant process attempts to retrieve (564) data, if any, from the local database through the synchronous connection between the secondary thread and the local database and returns (568) a response to the main application through the asynchronous connection with the main thread.

Note that, in some embodiments, the local database may not have the data requested by the main application. For example, if the user instruction is to refresh the web-based email service, the local database may not yet have the most recent messages in the inbox. Thus, upon receiving (570) the response from the assistant process, the main application first determines whether the response includes the requested data or not. If true (572, yes), the main application then uses the retrieved data to update (590) the user interface. If false (572, no), the main application then sends (574) a data request to the remote server application 322 through the asynchronous connection 514.

Upon receiving (576) the data request, the remote server application retrieves the requested data from the central database 120 and returns (578) the requested data to the client device. At the client side, after receiving (580) the requested data, the main application performs two operations: (i) sending (582) a data update request to the assistant process through the asynchronous connection and (ii) updating (590) the user interface. Note that the two operations may be performed in any order or in parallel. Upon receiving (586) the data update request, which includes the data returned by the server application, the assistant process updates (588) the local database.

Figure 5E:
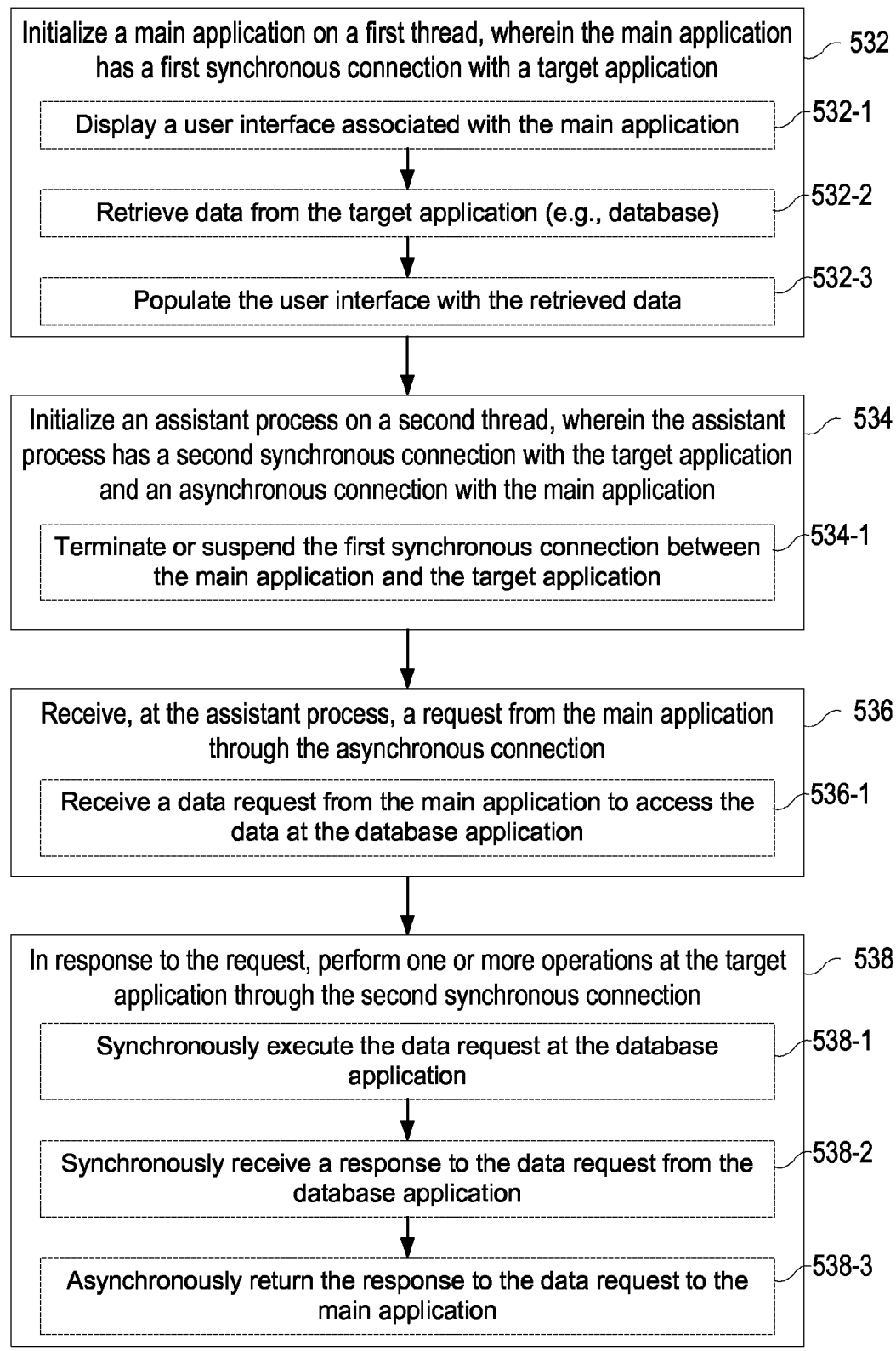
FIG. 5E is a flow diagram illustrating the startup process of multiple threads associated with a multi-thread software application in accordance with some embodiments.

Attention is now directed to FIG. 5E, which illustrates the startup process of multiple threads associated with a multi-thread software application in accordance with some embodiments. The startup process is executed by a computing device that has one or more processors and memory storing programs executed by the one or more processors. Exemplary computing devices include a desktop computer, a laptop computer, and a portable communication device such as a mobile phone that also contains other functions, such as PDA and/or music player functions.

In some embodiments, the computing device first initializes (532) a main application on a first thread. The main application has a first synchronous connection with a target application. Exemplary target applications include a database application at the computing device, an application for rendering images at the computing device, an application for accessing, transferring, or downloading a file, and an application for performing numerical computations, etc. For illustration, the subsequent description is directed to a web-based email service and the target application is a local database running on the client device. But one skilled in the art would be able to apply the same methodology to other types of software applications, which may or may not be web-based, as long as the process can defer the startup cost of the application and therefore improve user experience.

In some embodiments, after initialization, the main application displays (532-1) a user interface at the computing device such as a mobile phone's display panel. The user interface may include an icon of the inbox folder of the email service, which contains the email messages directed to the user of the mobile phone. To support user interactions with the user interface, the computing device retrieves (532-2) data such as those email messages from the database application and populates (532-3) the user interface with the email messages. At the conclusion of the initialization of the main application, the user should be able to submit various instructions supported by the email services such as viewing an incoming message, composing a new message, and deleting an existing message, etc.

After the main application performs one or more operations at the local database through the first synchronous connection, the computing device initializes (534) an assistant process on a second thread. In some embodiments, the assistant process has a second synchronous connection with the target application and an asynchronous connection with the main application (see, e.g., FIG. 5B). In some embodiments, the first synchronous connection between the main application and the local database is terminated (534-1) after the assistant process is initialized and a unit of communication between the main application and the target application is completed. For example, after populating the user interface with the retrieved messages, the main application may no longer maintain the direct connection with the local database. Instead, the main application waits to receive a readiness notification from the assistant process after the assistant process is initialized. This readiness notification indicates that the assistant process is ready to accept data access requests from the main application through the asynchronous connection and then execute the requests on the local database through the synchronous connection. As a result, the main application is relieved from managing the local database and focuses itself on processing user instructions in conjunction with the email service.

After the initialization of the assistant process and a completion of a modular task by the main application (e.g., the user interface is populated), the main application is ready to process user instructions. Upon receiving a user instruction such as deleting an email message in the local database, the main application sends a request to the assistant process. After receiving (536) a request from the main application through the asynchronous connection, the assistant process performs (538) one or more operations at the target application through the second synchronous connection. In some embodiments, the assistant process receives (536-1) a data request from the main application through the asynchronous connection to access the local database.

In response to receiving the data request, the assistant process synchronously executes (538-1) the data request at the database application and receives (538-2) a response to the data request from the database application. The assistant process asynchronously returns (538-3) the response to the data request to the main application. If the response includes the requested data, the main application may use the data to update the user interface. If the response does not include the requested data, the main application asynchronously submits a new request for the requested data to a remote server system and then receives the requested data from the remote server system. After receiving the requested data from the remote server system, the main application asynchronously forwards the requested data to the assistant process. The assistant process, in response, synchronously updates the database application with the requested data.

Deferring the initialization of an assistant process/secondary thread as described herein for the specific case of local database operations is useful in many situations where one or more of the following conditions exist: 1) the main thread responsible for executing an application can perform directly the synchronous operations that are to be performed by an assistant process/secondary thread; 2) it is costly to create/initialize the assistant process; and 3) the work needed to create the assistant process is usually part of the application's initialization process. In such a situation it improves the user experience with the application to allow the main thread to perform the tasks normally allocated to the assistant process at initialization, create the assistant process/secondary thread in parallel with those initial operations (thereby providing satisfactory user interaction with the application), and then hand over control to the assistant thread when it is safe to do so. This strategy can be employed where a single or multiple secondary threads need to be created to perform synchronous tasks in support of the main application thread.

Figure 6A:
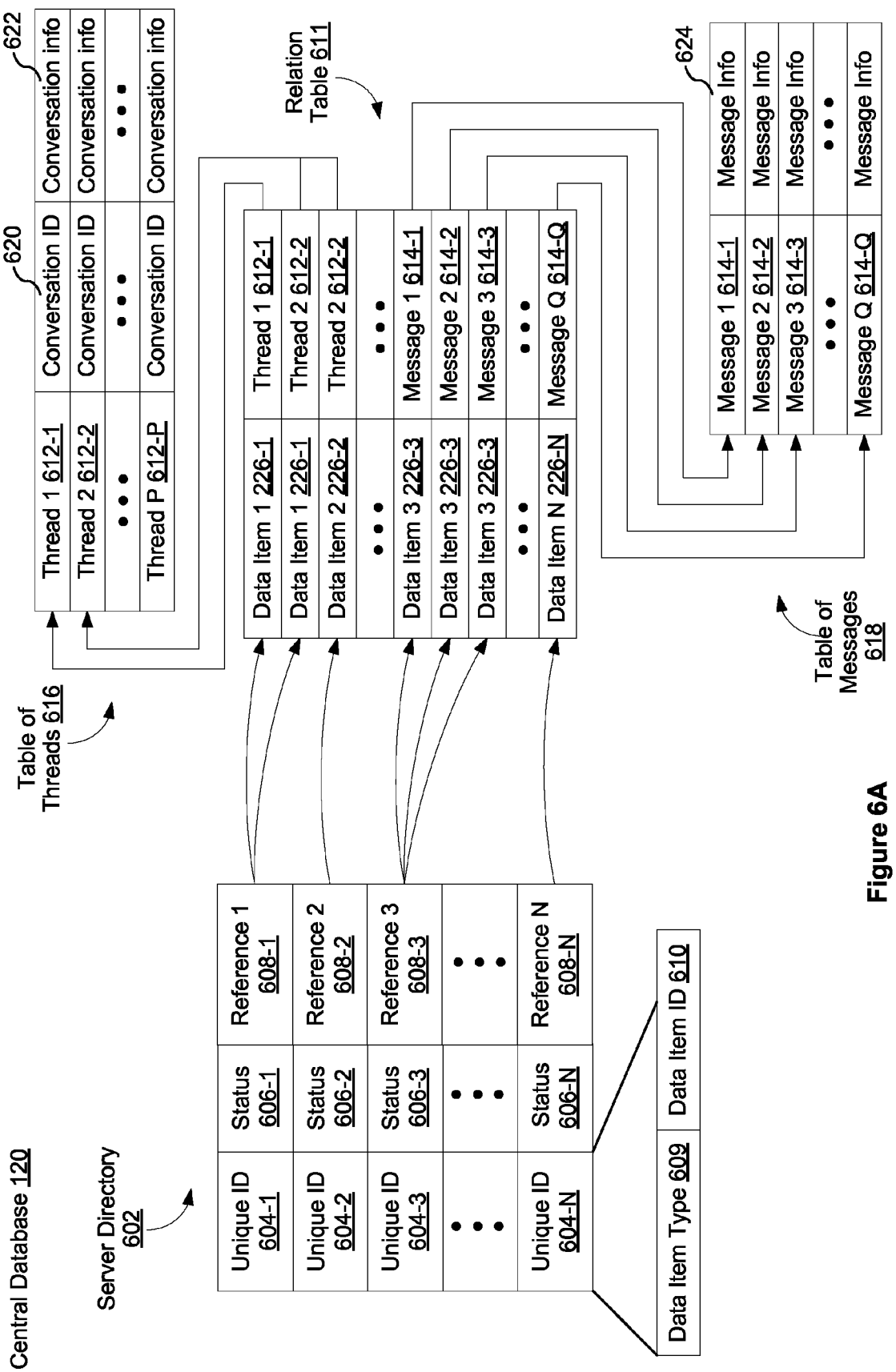
FIG. 6A is a block diagram illustrating data structures in a server system associated with web application in accordance with some embodiments.

Attention is now directed to FIG. 6A, which illustrates data structures in a server system associated with a web application in accordance with some embodiments. In some embodiments, the central database 120 includes a server directory 602. The server directory 602 is a lookup table that associates a unique identifier (e.g., "Unique ID" 604-1) with the status (e.g., "Status" 606-1) of the data item (e.g., Data Item 1 226-1) and a reference (e.g., "Reference 1" 608-1) to the data item.

In some embodiments, the unique identifier (e.g., "Unique ID" 604-N) includes a data item type 609 and a data item identifier 610. In some embodiments, the data item type 609 indicates the type of data item referenced by the unique identifier. For example, when the data item is a conversation (e.g., a list of messages), the data item type 609 includes "conversation" or a corresponding alphanumeric tag, and when the data item is a thread list (e.g., a list of conversations) the data item type 609 includes "thread list" or a corresponding alphanumeric tag. Alternatively, when the data item is a thread list (e.g., a list of conversations) the data item type 609 includes the name of the thread list. For example, when the thread list is an email inbox the data item type includes the alphanumeric tag "inbox," and when the thread list includes a plurality of conversations associated with the label "work," the data item type includes the alphanumeric tag "work." In some embodiments the data item type identifier may be a combination of data item type identifiers.

In some embodiments, the data item identifier is an identifier that uniquely identifies the data item within a subset of data items that is of a particular type (e.g., where the data item type 609 is "conversation" or where the data item type 609 is "message"). For example, in some embodiments, the data item identifier is a conversation ID (e.g., 620) or a message ID. In embodiment where the data item is a conversation (e.g., a list of messages), the data item identifier is the message identifier of the first message in the list of messages.

In some embodiments, the status (e.g., 606-1) of a data item (e.g., 226-1) is indicative of the last time that the data item was updated (e.g., replaced with a new data item), modified or accessed (e.g., viewed, copied, sent, etc.). The status is updated when an operation is performed on the data item.

In some embodiments the reference to a data item is a reference to a relation table 611 that includes a reference from the data item to each component of the data item. In some embodiments, the data item has multiple components. For example, reference 1 608-1 in the server directory 602 refers to two entries in the relation table 611 for data item 1 226-1: thread 1 612-1 and thread 2 612-2. (This situation arises because these two conversations/threads are each associated with the thread list identified by the reference 608-1). In some embodiments, the data item has a single component. For example, reference 2 608-2 refers to a single entry in the relation table 611 for data item 2 226-2: thread 2 612-2. In some embodiments, a plurality of distinct data items include a shared component. For example, data item 1 226-1 and data item 2 226-2 are each related to thread 2 612-2 in the relation table 611. In other words, a single conversation (e.g., a list of messages) may be included in multiple thread lists. For example, in an embodiment where the web application is a web-based email application and email messages are arranged into conversations (e.g., ordered lists of email messages), one or more of the conversations may include a plurality of labels, where each label is associated with a thread list (e.g., a conversation including the "inbox" label and the "work" label would be associated with both the "inbox" thread list and the "work" thread list).

In some embodiments the components are messages. As described above, the data item may include a single component or multiple components. For example, reference 3 608-3 (which is a reference for a conversation) refers to three entries in the relation table 611 for data item 3 226-3: message 1 614-1, message 2 614-2 and message 3 614-3, while reference N 608-N refers to a single entry in the relation table data item-N 226-N (e.g., message Q 614-Q).

In some embodiments, when a relation in the relation table is to a thread (e.g., thread 1 612-1), the relation refers to a table of threads 616, including a plurality of threads (e.g., thread 1 612-1, thread 2 612-2, thread P 612-P). In the table of threads 616, each thread is associated with a conversation identifier 620 and conversation information 622 about the thread. The conversation identifier 620 is an identifier that is used by the server system to identify messages that are associated with the conversation. In some embodiments the conversation information 622 includes the subject of the messages included in the conversation, a short "snippet" summarizing the most recent message in the conversation and/or the list of messages.

In some embodiments, when a relation in the relation table is to a message (e.g., message 1 614-1), the relation refers to a table of messages 618, including a plurality of messages (e.g., message 1 614-1, message 2 614-2, message 3 614-3, message Q 614-Q). In the table of messages 618, each message is associated with message information 624 about the message. In some embodiments the message information 624 includes the text of a message including any attachments.

Figure 6B:
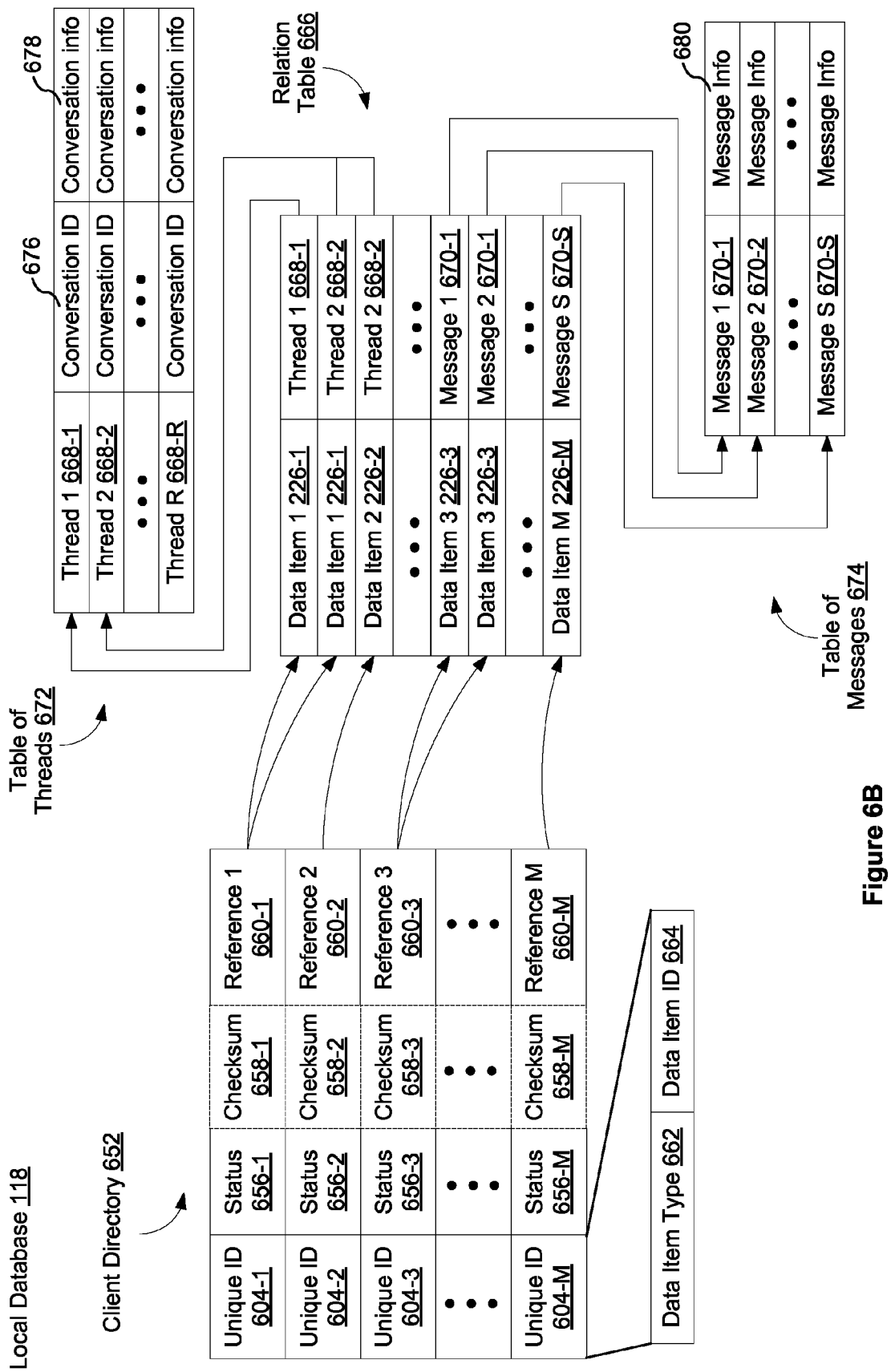
FIG. 6B is a block diagram illustrating data structures in a client system associated with a persistent web application in accordance with some embodiments.

Attention is now directed to FIG. 6B, which illustrates data associated with a web application in a client device in accordance with some embodiments. In some embodiments, the local database 116 includes a client directory 652. The client directory 652 is a lookup table that associates a unique identifier (e.g., "Unique ID" 604-1) with the status (e.g., "Status" 656-1) of the data item (e.g., Data Item 1 226-1) and a reference to the data item (e.g., "Reference 1" 660-1). In some embodiments, where checksums (e.g., 658-1, 658-2, 658-3, 658-M) are used to maintain cache coherence, a checksum for each data item (e.g., 226-1, a checksum (e.g., 658-1) is stored in the local database 116 and associated with the data item. In the embodiment illustrated in FIG. 6B, the checksum (e.g., 658-1) is stored in the client directory 652. However, it should be understood that the checksums could be stored in another part of the local database 116.

In some embodiments, the unique identifier (e.g., "Unique ID" 604-N) includes a data item type 609 and a data item identifier 610, as discussed in greater detail above with reference to FIG. 6A. In some embodiments a unique identifier on the server (e.g., "Unique ID" 604-1 in FIG. 6A) is identical to a unique identifier on the client (e.g., "Unique ID" 604-1 in FIG. 6B) and indicates that both unique identifiers are associated with the same data item.

In some embodiments, the status (e.g., 656-1) of a data item (e.g., 226-1) is indicative of the last time that the data item was updated (e.g., replaced with a new data item), modified or accessed (e.g., viewed, copied, sent, etc.). The status is updated when an operation is performed on the data item. In some embodiments the status of a data item on the server (e.g., 606-2 in FIG. 6A) and the status of the same data item on the client (e.g., 656-2 in FIG. 6B) are identical (e.g., when the local database and the central database are synchronized). In some embodiments the status of the data item on the server (e.g., 606-3 in FIG. 6A) and the status of the same data item on the client (e.g., 656-3 in FIG. 6B) are different (e.g., when the local database and the central database are not synchronized).

In some embodiments the reference to a data item is a reference to a relation table 666 that includes a relation between the data item and each component of the data item. In some embodiments, the data item has multiple components. For example, the reference 1 660-1 in the client directory 652 refers to two entries in the relation table 666 for data item 1 226-1: thread 1 668-1 and thread 2 668-2. (This situation arises because these two conversations/threads are each associated with the thread list identified by the reference 608-1). In some embodiments, the data item has a single component (for example, the reference 2 660-2 refers to a single entry in the relation table 666 for data item 2 226-2: thread 2 668-2.) In some embodiments, a plurality of distinct data items include a shared component. For example, data item 1 and data item 2 each contain a relation to thread 2 668-2. In other words, a single conversation (e.g., a list of messages) may be included in multiple thread lists. For example, in an embodiment where the web application is a mobile email application and email messages are arranged into conversations, one or more of the conversations may include a plurality of labels, where each label is associated with a thread list (e.g., a conversation including the "inbox" label and the "work" label would be associated both with the "inbox" thread list and the "work" thread list).

In some embodiments the components are messages. As described above, the data item may include a single component or multiple components. For example, reference 3 660-3 (which is a reference to a conversation) refers to two entries in the relation table 666 for data item 3 226-3: message 1 670-1, and message 2 670-2, while reference M 660-M refers to a single entry in the relation table data item M 226-M (e.g., "Message S" 670-S).

In some embodiments, when a reference in the reference table is to a thread (e.g., thread 1 668-1), the reference refers to a table of threads 672, including a plurality of thread (e.g., thread 1 668-1, thread 2 668-2, thread R 668-R). In the table of threads 672, each thread is associated with a conversation identifier 676 and conversation information 678 about the thread. The conversation identifier 676 is an identifier that is used by the client device to identify messages that are associated with the conversation (e.g., a list of messages). In some embodiments the conversation information 678 includes the subject of the messages included in the conversation, a short "snippet" summarizing the most recent message in the conversation and/or the list of messages.

In some embodiments, when a reference in the reference table is to a message (e.g., message 1 670-1), the reference refers to a table of messages 674, including a plurality of messages (e.g., message 1 670-1, message 2 670-2, message S 670-S). In the table of messages 674, each message is associated with message information 680 about the message. In some embodiments the message information 680 includes the text of a message including any attachments.

In some embodiments, as illustrated in FIGS. 6A and 6B, the central database 120 in FIG. 6A and the local database 116 in FIG. 6B have similar data structures. However, the data stored in these data structures is not always identical. In some embodiments, the central database 120 in FIG. 6A and the local database 116 in FIG. 6B have different data items, messages and threads stored in their respective data structures. In some embodiments the data items, messages and threads in the local database 116 in FIG. 6B and the central database 120 in FIG. 6A have been synchronized (e.g., made coherent) and are identical. In accordance with some embodiments, methods are disclosed for detecting when the local database 116 in FIG. 6B and the central database 120 in FIG. 6A are not synchronized and for synchronizing the databases, as described in greater detail below with reference to FIGS. 8A-8D.

For example, in FIG. 6A, the central database has N data items, P threads and Q messages (where N, P and Q all represent integers greater than 0), while in FIG. 6B, the local database 116 has M data items, R threads and S messages (where M, R and S all represent integers greater than 0). In some embodiments N=M, P=R, Q=S, and the data structures in the central database 120 in FIG. 6A store identical information to the data structures in the local database 116 in FIG. 6B. However, in some embodiments the central database 120 in FIG. 6A contains additional data that is not contained in the local database 116 in FIG. 6B and/or the local database 116 in FIG. 6B contains additional data that is not contained in the central database 120 in FIG. 6A (e.g., the central database is associated with a web-based email server, which receives one or more new email messages while the client device is not connected to the email server, and thus the central database contains one or more new email messages that are not contained in the local database).

Additionally, it should be noted that, in some embodiments, checksums 658-1 are stored in the local database 116 in FIG. 6B, while they are not stored in the central database 120 in FIG. 6A. Rather, as described in greater detail below with reference to FIGS. 8A-8D, checksums are computed by the server system on-the-fly (e.g. on an "as needed" basis) and thus are not stored in the central database 120 in FIG. 6A.

Although exemplary data structures have been described herein for illustrative purposes, it should be understood that alternative data structures could be used in their place to store the data items and associated information about the data items described above. In some embodiments multiple servers containing multiple databases are used to store the data items on the server system, and different data structures specially adapted to such distributed systems may be used. In one such alternate embodiment, data structures such as those described in U.S. patent publication no. 2005/0222985 A1 (which is hereby incorporated by reference in its entirety) are used to store the data items, conversations and related information which are described as being stored in central database 120. For example, in a web-based email application, emails, conversations and other related information may be stored in data structures that are specially adapted to be distributed among a plurality of servers and databases to improve access speed and fault tolerance.

Figure 7A:
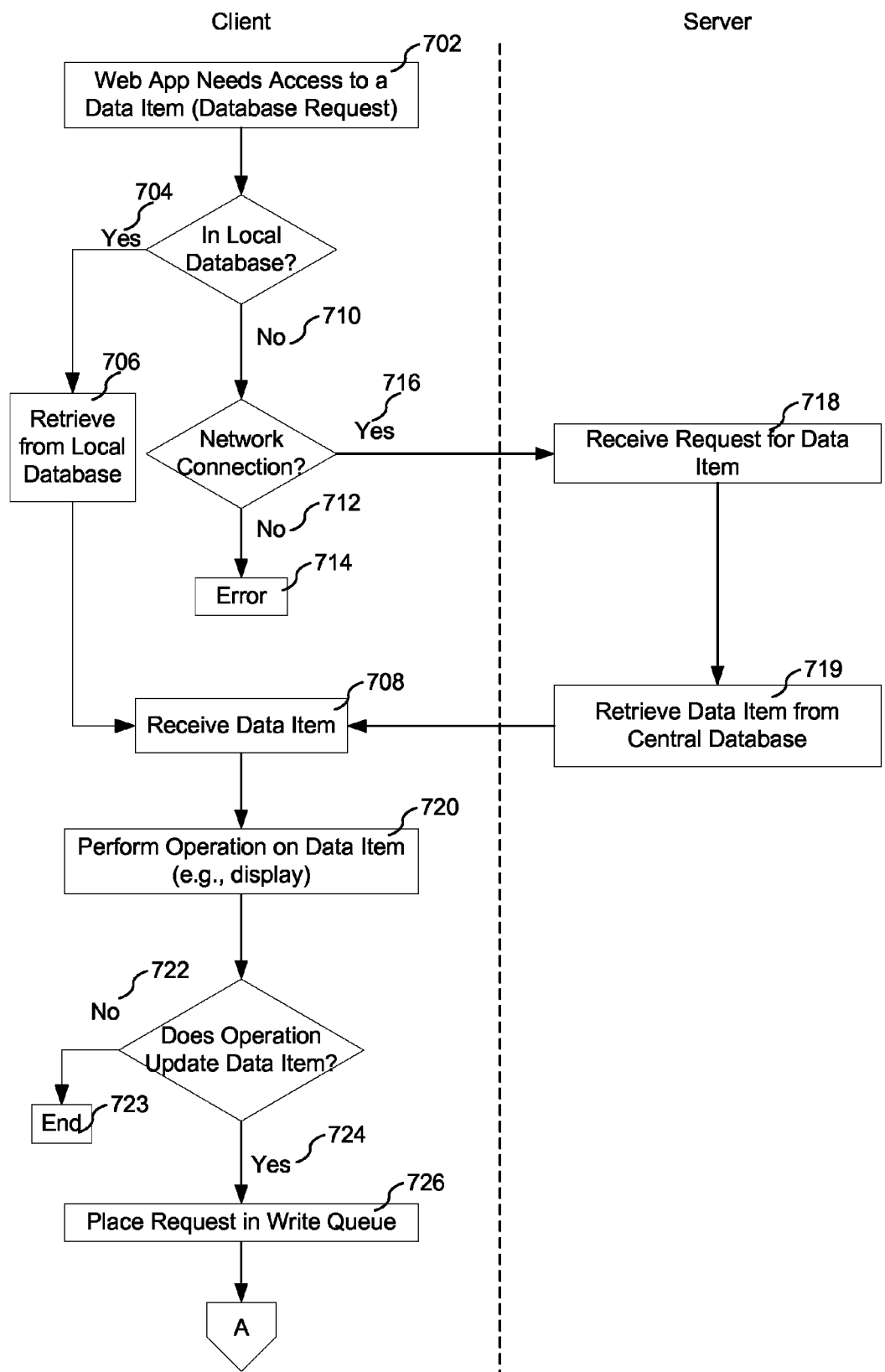
FIGS. 7A-7B depict a flow diagram illustrating client and server roles in a process for transferring data between a persistent web application on a client system and a server system in accordance with some embodiments.
Figure 7B:
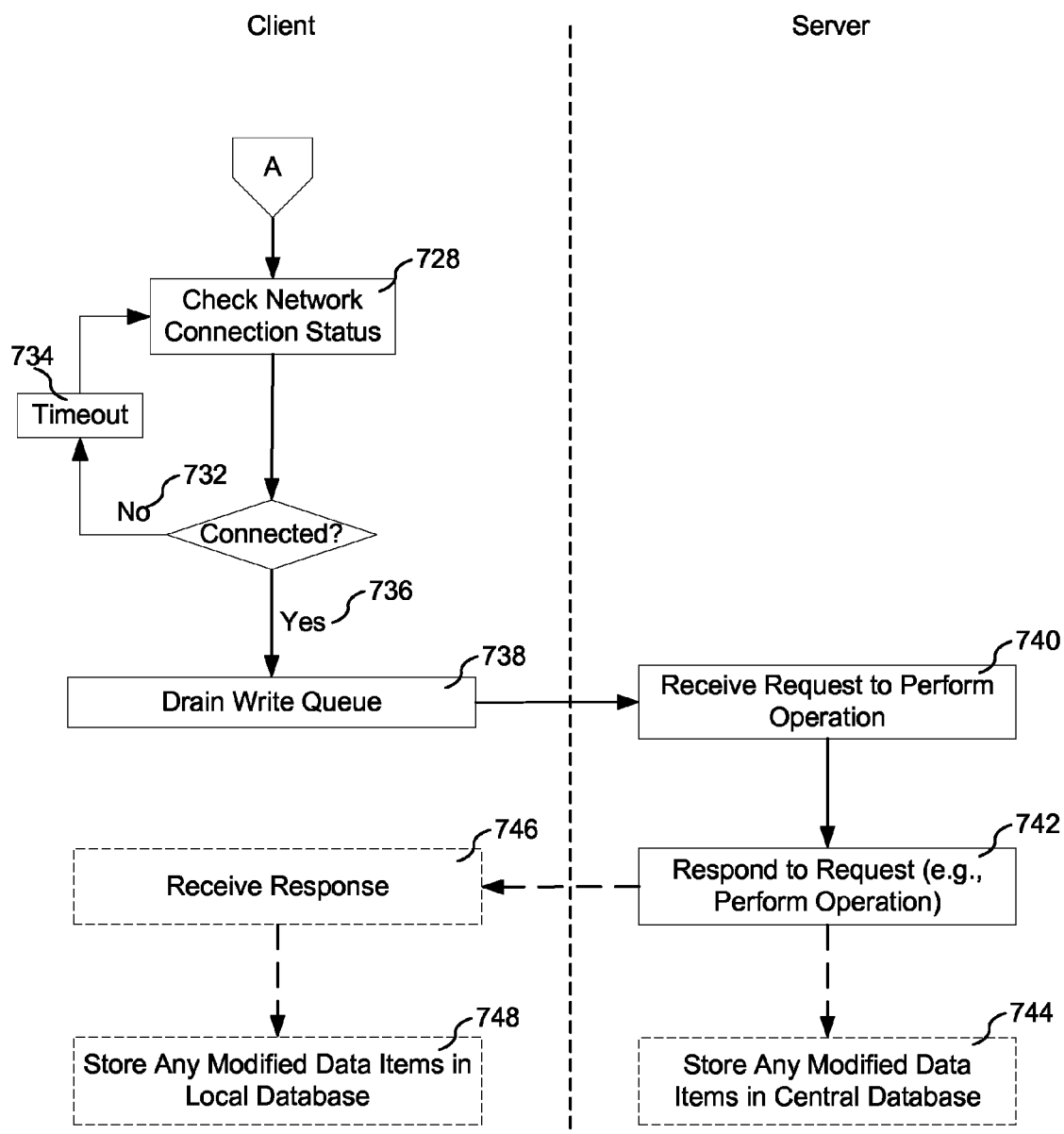
Figure 8A:
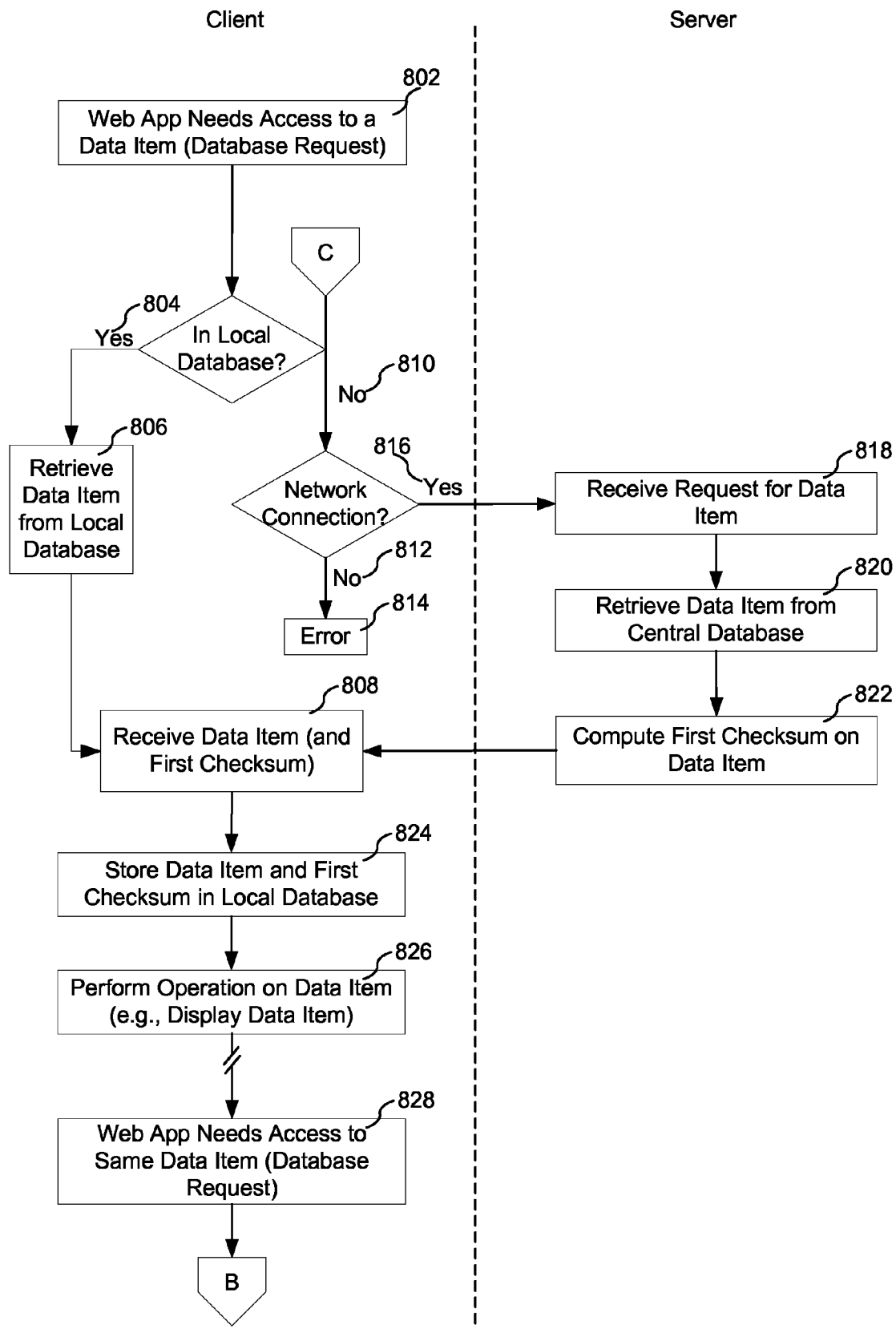
FIGS. 8A-8D depict a flow diagram illustrating client and server roles in a process for synchronizing data between databases using a checksum exchange in accordance with some embodiments.
Figure 8B:
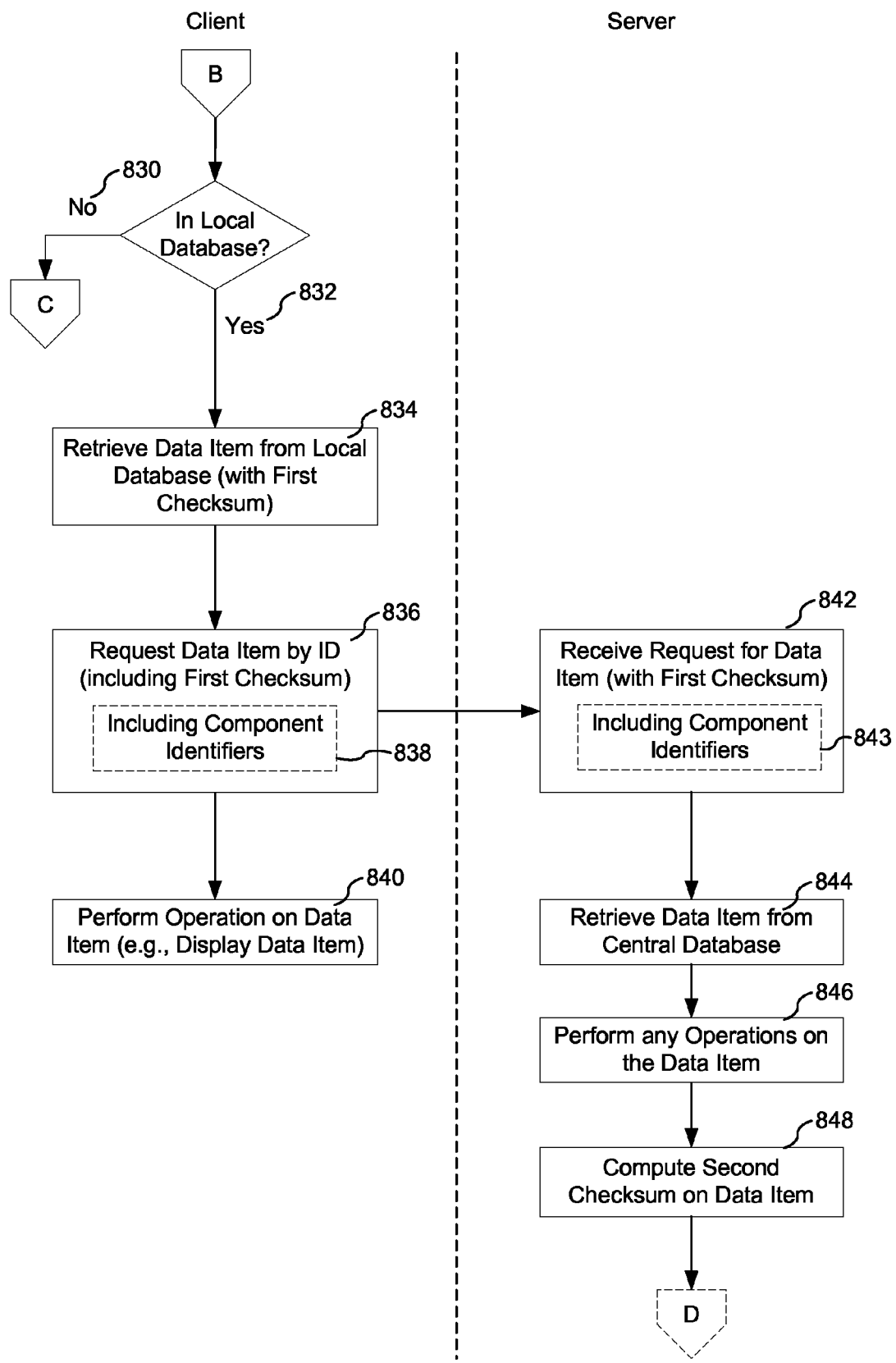
Figure 8C:
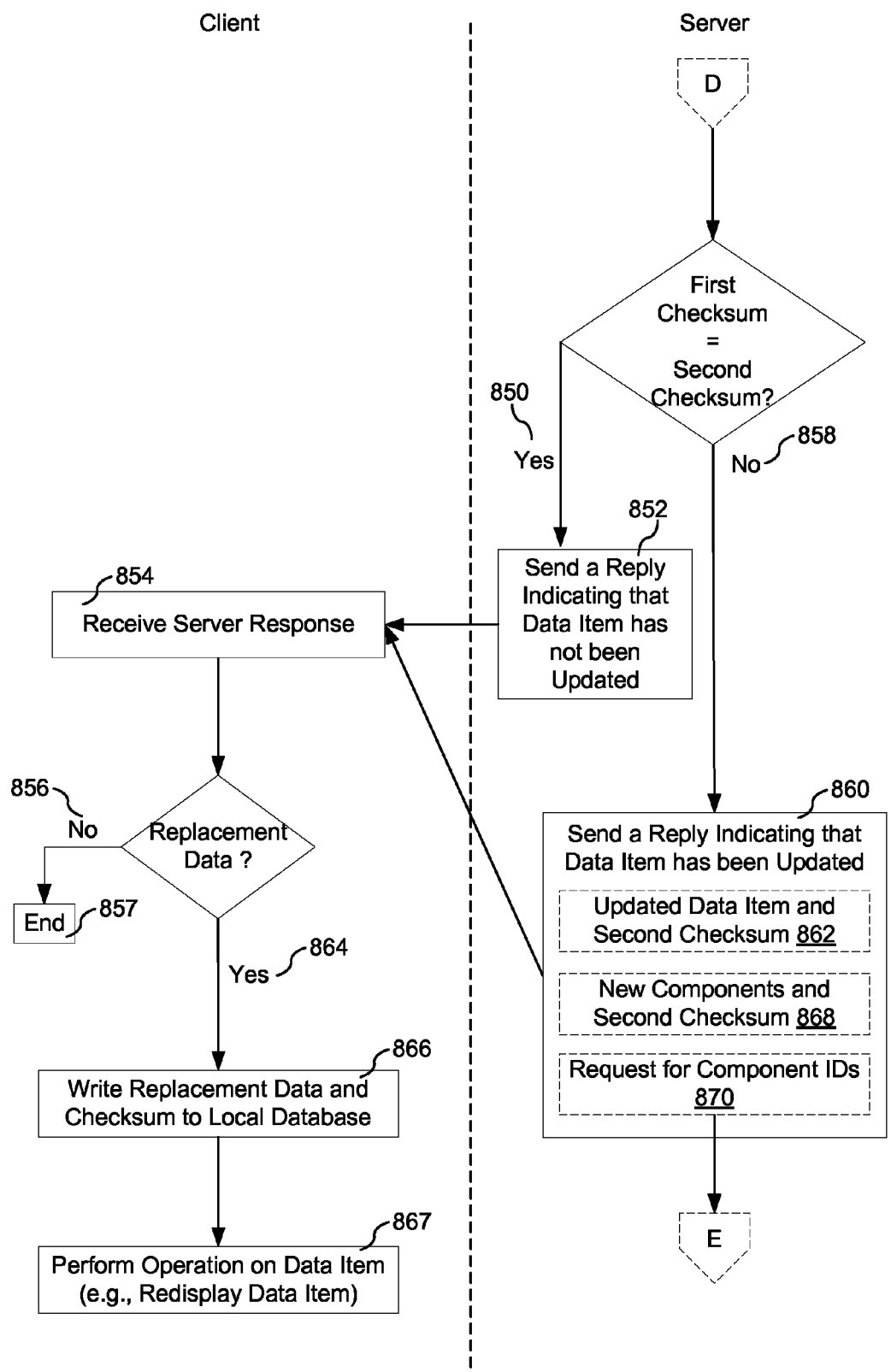
Figure 8D:
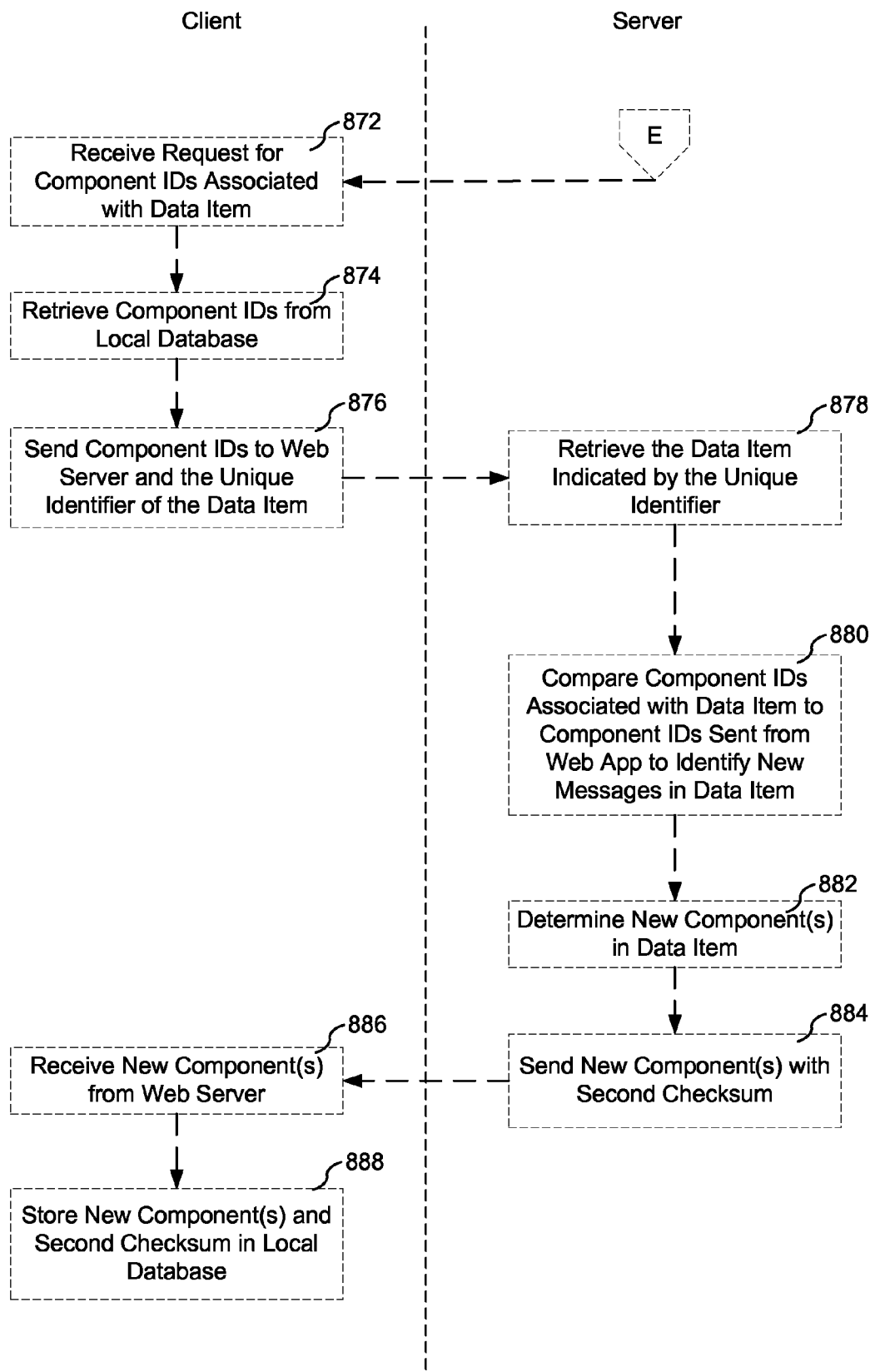

Attention is now directed to FIGS. 7A-7B, which illustrate client and server roles in a process for transferring data between a persistent web application on a client and a server system in accordance with some embodiments. The client (102 in FIG. 2) has a client application (e.g., web browser 112 in FIG. 2) including a local web application (e.g., 114 in FIG. 2). In some embodiments the local web application (e.g., 114 in FIG. 2) has both online and offline modes. For example, when the web application is a web-based email program, the program may store some of the frequently used email messages (e.g., data item 226-1 in FIG. 2) in a local database (e.g., 116 in FIG. 2).

The process begins when the web application needs access (702) to a data item such as an electronic message (e.g. an email), a conversation (e.g., a list of electronic messages), or a thread list (e.g., a list of conversations). In one example, the web application receives a request from a user to display the data item, send the data item, edit the data item, or perform some other operation on the data item. The client checks to see if the data item is in the local database. If the data item is (704) found in the local database, the data item is retrieved (706) from the local database and the web application receives (708) the data item.

In some embodiments, the web application is a web-based email application (e.g., Gmail) with offline capabilities (e.g., is a persistent web-based application). For example, when the client has access to a network connection, the web application behaves just like a normal web-based email interface, where the user logs into a web page and checks email messages and performs other operations. However, in some embodiments, the web-based email program has offline capabilities because it has access to a local database that is used to store some of the email messages that are most likely to be accessed by the web application and other local application data. Then, when the client does not have access to a network connection and the user attempts to access the web-based email program through the web browser, the web application still allows the user to access the emails stored in the local database, and perform operations on the emails stored in the local database.

In some embodiments (e.g., where network latency is large) it is desirable to store some data items in a local database so as to reduce the delay between receiving an input from a user and performing an operation indicated by the input on (e.g., displaying) one or more data items. Thus, a local database can act as a cache for data items so that instructions from the web application can be performed on the data items in the local database before receiving a reply from the server system. This structure is analogous to a hardware cache associated with a microprocessor that is used to speed up processing operations in a hardware system by caching data for use by the processor and thus reducing the effects of communication latency between requests for data and receipt of the requested data by the microprocessor.

In some embodiments, the document object model of the web browser is used as a L1 cache. As suggested by the kinds of caches found in hardware, software using the document object model as L1 cache could be write-back or write-through. In some embodiments, a write-back cache of document object model fragments as an L1 cache is appropriate when the web application implements some user actions by directly modifying the document object model. Other features in the embodiment suggested by its analogy with hardware caching, in accordance with some embodiments, are prefetching of data items and load forwarding (i.e., where responses from the server are forwarded directly to the web browser 112 for display on display 206 before being written to local database 116).

In some embodiments, the write queue 220 is stored in non-volatile memory, so that even if the web application crashes or the web browser running the web application crashes, any operations written to the write queue by the web application up to that point are preserved.

In some embodiments, a requested data item may not be in the local database because it has never been requested by the client, or it may not be in the local database, because it has been removed from the local database due to a cache replacement policy. In some embodiments, when the system detects that the local database (e.g., cache) is full, at least some of the data items in the local database (e.g., cache) are marked for deletion in accordance with a cache replacement policy, which can be one of a number of options.

In some embodiments the cache replacement policy is a least recently used (LRU) policy in which the data items that were least recently used are deleted from the local database first. In some embodiments the cache replacement policy is a least frequently used policy in which the data items that are accessed least often are deleted from the local database first. In some embodiments, the cache replacement policy is determined by some other factor including which data items are the oldest or have the largest file size. In some embodiments, the cache replacement policy is random, in which data items are randomly (i.e., without regard for any criteria associated with the data item) deleted from the cache. In some embodiments the cache replacement policy is based on a combination of factors that determine which data items are most-likely to not be needed by the web application (e.g., knowing that email with certain characteristics might not be read more than once). In one embodiment a replacement priority is computed at the server for each data item and stored in the local database, and data items in the local database are marked for deletion in descending order by replacement priority. Additionally, it should be understood that any cache replacement strategy that is used in hardware caches could be used to determine which data items in the local database are marked for deletion. In some embodiments, the client periodically removes all data items that are marked for deletion from the local database. Teaching in the prior art as to application of these replacement strategies is relevant to different embodiments of the present invention.

If the data item is not found (710) in the local database and the client does not detect (712) a network connection, and error is returned (714) to the web application. In some embodiments an error is also returned (e.g., displayed) to the user of the web application.

If a network connection is detected (716), then a request is sent to the server system including a unique identifier (e.g., 604-1 in FIG. 6B) using a communication interface (e.g., web interface). The server system receives (718) the request and, in some embodiments, uses the unique identifier (e.g., 604-1 in FIG. 6B) to look up a data item in a central database (e.g., 120 in FIG. 6A) by matching the received unique identifier (e.g., with a unique identifier (e.g., 604-1 in FIG. 6A) in a server directory (e.g., 602 in FIG. 6A). The server system retrieves (719) the data item (and in some embodiments, additional information associated with the data item) from the central database, and sends the data item (and any associated information) to the client.

In some embodiments, the request is specified by the user such as a request to display an uncompressed representation (sometimes called an expanded representation) of the data item after detecting a selection of a compressed representation of the data item. In one example, an email inbox is displayed, the email inbox containing header information (e.g., the sender and subject) for a plurality of email messages or groups of email messages (e.g., one or more related email messages may be grouped together under one header as a single conversation). In this example, when the user selects the header of one email message or conversation and the web application displays the entire email message (when the header is a header for a single message) or a list of at least some of the email messages in the conversation (when the header is a header for a conversation of email messages).

In some embodiments, the request is automatically generated by the web application. In some embodiments the automatically generated request is to preload the data items that are most likely to be accessed by the user. In one example, an inbox is displayed containing header information (e.g., the sender and subject) for a plurality of email messages or groups of email messages (e.g., one or more related email messages may be grouped together under one header as a single conversation). In this example, the web application automatically generates a request for the data item associated with each of the headers in the current view of the inbox. It should be understood that the current view of the inbox could be any one of: all of the headers in the inbox (e.g., all of the messages/conversations in the inbox are requested), all of the headers that are included on a current page of the inbox (e.g., all of the messages/conversations that the user can scroll to on the screen are requested), and all of the headers that are currently displayed on the display (e.g., only the messages/conversations associated with the headers that are currently viewable by the user without scrolling are requested).

The client receives (708) the data item and performs (720) an operation on the data item. In some embodiments the operation does not update the data item (e.g., an email is displayed to a user). In some embodiments the operation does update the data item (e.g., the operation is a modification operation such as adding to or deleting an email message from a conversation of email messages). If the operation does not (722) update the data item, then the web application process ends (723). If the operation does (724) update the data item, then the web application places (726) a request to perform the operation in the write queue (e.g., 220 in FIG. 4). In some embodiments, the operations in the write queue include the unique identifiers of any data items associated with the operation (e.g., if the operation is to add a message to a respective conversation, then the operation includes the unique identifier of the respective conversation). In some embodiments, the server system uses this unique identifier to identify the data item stored in the central database on which the operation is to be performed (e.g., the server system identifies the respective conversation stored in the central database and adds the message to it).

In some embodiments, after placing an operation in the write queue, the web application checks (728) the network connection status. If the client is not (732) connected to the network, then the client device waits for a timeout (734) period and the rechecks (728) the network connection status. In some embodiments, the web application periodically checks the network connection status based whether or not an operation has been added to the write queue (e.g., every 5 minutes).

When the web application detects that the client device is (736) connected to the network, the write queue maintained in client memory is drained to the connected server. In some embodiments, it is important that the write queue is maintained in non-volatile memory so that user actions that have been made but not yet sent to the server system (e.g., because there is no network connection) are saved if the web browser crashes. In some embodiments, the write queue is drained in the order in which operations were added to the write queue (e.g., the oldest operation is sent to the server system first, followed by the second oldest, etc.). In some embodiments, it is important that the actions in the write queue are implemented in the order added to the queue, so as to ensure that when there are multiple operations that modify the same data item, the operations are performed in the correct order. (e.g., a first operation applies the label "work" to a respective message/conversation and a second operation marks all messages/conversations associated with the "work" label with a flag that indicates that the message/conversation has been read by the user).

In some embodiments, the server system receives (740) the request from the web application and responds (742) to the request (e.g., by performing the operation indicated in the request on one or more data items indicated by the unique identifier(s) associated with the request). In some embodiments, any data items that were modified by the operation are stored (744) in the central database on the server system. In some embodiments, the response to the request includes sending a response to the web application on the client including any modified data items. The client receives (746) the response and stores (748) any modified data items in the local database. In some embodiments, the client makes the modifications to the data items in the local database as the operations are drained from the write queue instead of (or before) receiving any response from the server to the request to perform the operations.

Attention is now directed to FIGS. 8A-8D, which illustrate client and server roles in a process for synchronizing data between databases using a checksum exchange in accordance with some embodiments. In some embodiments the client includes a local database that needs to be synchronized (e.g., made coherent) with a central database on a server system or other distinct computing device that is distinct from the client device. In one example, the web application is a web-based email application that stores email messages, lists of related email messages (e.g., conversations), and lists of related conversations (e.g., thread lists). In this example, the web-based email application provides a user with access to the messages/conversations in an email account, and it is desirable to keep the web application (e.g., an application for accessing web-based email) synchronized with a server application (e.g., an email server that manages all of the emails/conversations associated with the email account).

The process begins when the web application needs access (802) to a data item such as an electronic message (e.g. an email), a conversation (e.g., a list of electronic messages), or a thread list (e.g., a list of conversations). In one example, the web application receives a request from a user to display the data item, send the data item, edit the data item, or perform some other operation on the data item. The client checks to see if the data item is in the local database. If the data item is (804) found in the local database, the data item is retrieved (806) from the local database and the web application receives (808) the data item. In some embodiments, the data item retrieved from the local database includes a first checksum that was stored in the local database previously, as discussed in greater detail below.

In some embodiments, the web application is a web-based email application (e.g., Gmail) with offline capabilities. For example, when the client has access to a network connection, the web application behaves just like a normal web-based email interface, where the user logs into a web page and checks email messages and performs other operations. However, in some embodiments, the web-based email application has offline capabilities, enabled by providing the application with access to a local database, which stores some of the email messages that are most likely to be accessed by the web application. Then, when the client does not have access to a network connection and the user attempts to access the web-based email program through the web browser, the web application (e.g., web-based email application) still allows the user to access the emails stored in the local database, and perform operations on the emails stored in the local database.

In some embodiments, the client operates in an offline mode, including accessing a data item stored in the local database, detecting an operation performed on the data item, writing information characterizing the operation to the write queue along with the identifier of the data item, computing a checksum of the updated data item and storing the computed checksum in the local database, as discussed in greater detail above with reference to FIGS. 7A-7B. In some embodiments, when a network connection is detected between the web application and the server system, the client drains the write queue to the server system (e.g., a web-based email server or a server system), where each request sent to the server system includes the operation, a unique identifier of one or more data items modified by the operation, and a checksum for each of the one or more data items.

The local database is stored in non-volatile memory, so that even if the web application crashes, any operations written to the write queue by the web application up to that point are preserved.

A data item may not be in the local database because it has never been requested by the client, or it may not be in the local database, because it has been removed from the local database through the implementation of a cache replacement policy. In some embodiments, when the system detects that the local database (e.g., cache) is full, at least some of the data items in the local database (e.g., cache) are marked for deletion in accordance with a cache replacement policy, as described in greater detail above with reference to FIGS. 7A-7B.

If the data item is not found (810) in the local database and the client does not detect (812) a network connection, and error is returned (814) to the web application. In some embodiments an error is also returned (e.g., displayed) to the user of the web application.

If a network connection is detected (816), then a request is sent to the server system including a unique identifier (e.g., 604-1 in FIG. 6B) using a communication interface (e.g., web interface). The server system receives (818) the request and, in some embodiments, uses the unique identifier (e.g., 604-1 in FIG. 6B) to look up a data item in a central database (e.g., 120 in FIG. 6A) by matching the received unique identifier (e.g., with a unique identifier (e.g., 604-1 in FIG. 6A) in a server directory (e.g., 602 in FIG. 6A). The server system retrieves (820) the data item (and in some embodiments, additional information associated with the data item) from the central database, and sends the data item (and any associated information) to the client.

In some embodiments the server system computes (820) a first checksum on the data item, and sends the data item and the first checksum associated with the data item to the client. The client receives (808) the data item and the first checksum in the local database and performs (826) an operation on the data item (e.g., displays the data item). In some embodiments, performing an operation on the data item includes modifying the data item, and the client computes a checksum for the modified data item and replaces the first checksum that is stored in the local database with the client-computed checksum.

In some embodiments, at a later point in time, the web application needs (828) access to the data item for a second time. The client checks to determine whether the data item is in the local database. Even though the data item was previously requested from the server system and stored in the local database, the data item may no longer be stored in the local database. For example, if the data item has been removed from the local database through the implementation of a cache replacement policy, the client will not find the data item in the local database. If the data item is not (830) found in the local database, the client checks to see if there is a network connection. If there is (816) a network connection, the client sends a request to the server system for the data item, and receives responses as described in greater detail above. For example, where the web application is a web-based email application, the first time that the web application needs an email conversation (e.g., to display the conversation), it must request the conversation from the web-based email server. In this example, the web-based email server computes a checksum on the conversation and sends a unique identifier associated with the conversation and the checksum to the client, which are stored in a local database. Then, the second time the web application needs the conversation, it can simply send the unique identifier associated with the conversation and a checksum to the server.

If the data item is (832) found in the local database, the client retrieves the data item from the local database, including the first checksum (or the client-computed checksum) and a unique identifier associated with the data item. The client sends (836) a request to the server system. In some embodiments, this request includes the first checksum (or the client-computed checksum). In some embodiments, the client device periodically sends the first checksum and the unique identifier to the server system, where it is compared with a checksum for the data item on the server. For example, a web-based email application can periodically confirm that a particular conversation is up to date by sending a checksum of the conversation to the web-based email server. In this example, the server computes a checksum of the conversation (as stored in the server system) and, if the checksums do not match, sends the conversation (as stored in the server system) to the web-based email application.

In some embodiments the data item has a plurality of discrete components (e.g., the data item is a conversation and the discrete components are messages) and the request includes (838) identifiers of components (e.g., the request includes message identifiers when the data item is a conversation that is a list of messages). In some embodiments the identifiers of components include all of the components associated with the data item on the client (e.g., messages identifiers for all of the messages in the conversation, as stored on the client).

In some embodiments, the request (e.g., 836) sent by the client to the server system is automatically generated by the web application. In some embodiments the automatically generated request is to preload the data items that are most likely to be accessed by the user. In one example, an inbox is displayed containing header information (e.g., the sender and subject) for a plurality of email messages or groups of email messages (e.g., one or more related email messages may be grouped together under one header as a single conversation) that are associated with an attribute "inbox." In this example, the web application automatically generates a request for the data item associated with each of the headers in the current view of the inbox. It should be understood that the current view of the inbox could be any one of: all of the headers in the inbox (e.g., all of the messages/conversations in the inbox are requested), all of the headers that are included on a current page of the inbox (e.g., all of the messages/conversations that the user can scroll to on the screen are requested), and all of the headers that are currently displayed on the display (e.g., only the messages/conversations associated with the headers that are currently viewable by the user without scrolling are requested).

In some embodiments data items may be displayed as a compressed representation (e.g., in a compressed form) or as an uncompressed representation (e.g., in an uncompressed form). Data items displayed in a compressed form include less information than data items displayed in an uncompressed form. In some embodiments, a data item displayed in a compressed form includes only the header information (e.g., subject, sender and date/time) about the data item (e.g., the header information about the first message in a conversation or the first conversation in a thread list). In some embodiments, a data item displayed in a compressed form includes displaying header information for a plurality of the components of the data item. For example, when the data item is a thread list (e.g., an inbox), displaying the thread list in a compress form includes displaying headers for one or more of the components (e.g., conversations) of the thread list. For example, when the data item is a conversation (e.g., a conversation), the displaying the conversation in a compressed form includes displaying headers for one or more of the components (e.g., messages) of the conversation.

In some embodiments, the web application initially only has enough information about a data item to display the compressed form of the data item (e.g., initially the headers of all of the most recent conversations are downloaded from the server). When the web application requests access to a particular data item (e.g., the thread list such as an email inbox, including one or more conversations), the compressed form of the data item is displayed (e.g., the headers of all of the conversations in the inbox are displayed). In addition, when the web application requests access to a particular data item (e.g., a web email inbox), the full data item is downloaded so that the web application can display the uncompressed form of the data item (e.g., the headers or content of all of messages in each of the conversations). For another example, the web application may initially display a conversation in a compressed form (e.g., only displaying the headers of one or more of the email messages in the conversation), and may display the conversation in an uncompressed form (e.g., displaying full text of one or more additional email messages in the conversation) upon receiving a request from a user to display the uncompressed form of the conversation (e.g., a request to view the full text of one of the messages in the conversation).

In some embodiments, after the request has been sent to the server system, the client performs (840) an operation on the data item (e.g., displaying the data item) that is stored in the local database. In some embodiments, this operation is performed while waiting for a response from the server system.

In some embodiments, the server system receives (842) the second request for the data item from the web application, wherein the second request includes an identifier of the data item and the first checksum. In some embodiments the data item has a plurality of discrete components (e.g., the data item is a conversation and the discrete components are messages) and the request includes (843) identifiers of components (e.g., the request includes message identifiers when the data item is a conversation that is a list of messages). In response, the server system retrieves the data item from the central database (844). In some embodiments, the server system has operations to perform on the data item (e.g., operations that were stored in write queue and sent with the request). The server system performs (846) any operations modifying the data item (e.g., performs all operations from the write queue, as discussed in greater detail above with reference to FIGS. 7A-7B), and then computes (848) a second checksum of the data item.

In some embodiments the server system compares the first checksum (or the client-computed checksum) to the second checksum. If the checksums match (850), then the server system determines that the data item has not been updated, and sends (852) a reply to the client device indicating that the data item has not been updated. In some embodiments, the reply indicating that the data item has not been updated is an empty reply (e.g., it is substantially similar to a reply indicating that the data item has been updated, except that it does not contain any data to add to the data item or replace the data item in the local database). The client receives (854) the response from the server, and because there is no (856) replacement data, the process ends (857).

If the checksums do not match (858), then the server system determines that the data item has been updated and sends (860) a reply to the client indicating that the data item has been updated. It should be understood that there are multiple strategies for updating a data item in the local database: in accordance with some embodiments, either 1) all of the data associated with the data item is replaced, or 2) just the components of the data item that have been changed or are new are replaced/added to the data item.

In some embodiments, the reply includes an updated data item (862) and the second checksum (e.g., the entire updated data item is sent to the client). The client receives (854) the response from the server, and because there is (864) replacement data (e.g., a replacement conversation), the data item and the second checksum received from the server system are stored (866) in the local database, and replace the old data item (e.g., the previously stored conversation) and the first checksum (or the client-computed checksum). This embodiment is particularly beneficial where network latency is high (e.g., communication takes a long time) and the network connection has a high bandwidth (e.g., large amounts of data can be transferred easily).

In some embodiments, after the updated data item (or data item components) are received from the server system, the data item is redisplayed (867) in the web application. For example, a user may submit a request to view a conversation (e.g., a list of email messages) in an email inbox. In this example, the web application initially displays the copy of the conversation that is stored in the local database. In conjunction with displaying the locally-stored conversation, the web application simultaneously (or near simultaneously) sends a request to the server system including a checksum locally-stored conversation. In this example, if the server system sends a replacement conversation (update data item) or additional email messages for the conversation (new/updated components), then the web application redisplays the updated conversation (or the new emails in the conversation). In some embodiments, the data item is automatically updated (e.g., automatically redisplayed). In some embodiments, a message indicating that the currently displayed data item is not up to date (e.g., that there is an updated data item available) is displayed. For example, the message could be a message such as: "new messages have been received for this conversation, would you like to display them?" In some embodiments, an updated data item is displayed (e.g., the data item is redisplayed) when the user requests that the updated data item be displayed (e.g., by selecting a "reload" button or by selecting a "display new messages" button).

In some embodiments, where the request from the client included component identifiers (e.g., message identifiers) the reply includes (868) one or more new components. In some embodiments a new component of a data item is a component with a component identifier that does not match any of the identifiers of the components of the old data item (e.g., a new email has been added to the conversation). In some embodiments a new component is an updated component that has a different checksum than the old component with the same component identifier (e.g., an email in the conversation has been modified). New components are components that are associated with the data item, but are not associated with any of the component identifiers included in the request.

For example, where the data item is a conversation and the components are email messages in a conversation, the client sends the server a request including the identifier of the conversation and a list of email messages (e.g., a first email, a second email, and a third email) that are components of the conversation. In this example, the server retrieves the conversation from the central database and notes the message identifiers included in the conversation (e.g., a first email, a second email, and a third email, a fourth email and a fifth email), and sends only the new email messages (e.g., the fourth email and the fifth email) to the client device in the reply. The client receives (854) the response from the server, and because there is (864) replacement data, the new components of the data item are stored (866) in the local database and associated with the data item in the local database. Additionally, the second checksum replaces the first checksum (or the client-computed checksum) in the local database. This embodiment is particularly beneficial where network latency is high (e.g., communication takes a long time) and the network connection has a lower bandwidth (e.g., there are some limitations on how much data can be transferred, so it is beneficial to send only a few components of the data item when only a few components are necessary to synchronize the data item stored in the local database with the data item stored in the central database).

In some embodiments, where the request from the client did not include component identifiers, the reply includes (870) a request for the component identifiers in the data item. In this embodiment the client receives (872) the request for component identifiers associated with the data item (e.g., message identifiers associated with a conversation or thread identifiers associated with a thread list). The client retrieves (874) the component identifiers associated with the data item from the local database and sends (876) the component identifiers (along with the associated unique identifier for the data item) to the server system. The server system receives the request and retrieves (878) the data item indicated by the unique identifier from the central database.

The server system compares (880) the component identifiers associated with the data item in the central database with the component identifiers sent to the server system by the client device. By comparing the two sets of component identifiers, the server system determines (882) which components, if any, of the data item in the central database are new. In one example, the data item is a conversation with three messages (e.g., components) where the client's version of the conversation has only the first two messages, while the server system's version of the conversation has all three messages. In this example, the client sends the server system message identifiers for a first message and a second message in the conversation. In this example, the server system retrieves the conversation from the central database, identifies the first message, the second message and a third message. In this example, the server system compares the messages identifiers from the client to the messages retrieved from the central database and determines that the third message is a new message (e.g., a new component).

In some embodiments, after determining that there are one or more new components in the data item, the server system sends (884) the one or more new components to the client with the second checksum. The client receives (886) the one or more new component(s) and the second checksum, and stores (888) the one or more new components and the second checksum in the local database. It should be noted that while this embodiment includes more trips back and forth, overall the trips include a smaller quantity of data transferred between the client and server. Thus, this embodiment is particularly beneficial where network latency is low (e.g., communication takes a short time) and the network connection has a low bandwidth (e.g., there are limitations on how much data can be transferred, so it is beneficial to send only those components of the data item that it is necessary to send).

In some embodiments a combination of the methods (e.g., updating the whole data item, sending components or sending a request for a list of components and then sending the components) for updating data items are used, the client device determines the bandwidth of the connection between the client device and the server system and/or the latency of the connection and determines the best method to use based on considerations of bandwidth availability or lag time due to network latency. In some embodiments, the server system determines the bandwidth of the connection between the client device and the server system and/or the latency of the connection and determines the best method to use based on considerations of bandwidth availability or lag time due to network latency.

Each of the methods described herein may be governed by instructions that are stored in a computer readable storage medium and that are executed by one or more processors of one or more server systems 106 or client devices 102. Each of the operations shown in FIGS. 7A-7B and 8A-8D may correspond to instructions stored in a computer memory or computer readable storage medium.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method comprising:
   initializing, by a computing device, a main application on a first thread, wherein the main application has a first synchronous connection with a target application and initialization of the main application includes displaying a user interface;
   initializing, by the computing device, an assistant process on a second thread, wherein a start of the second thread is deferred until after the first thread has performed one or more synchronous operations at the target application through the first synchronous connection, the assistant process having an asynchronous connection to the main application and the assistant process having a second synchronous connection to the target application;
   performing, by the assistant process in response to the assistant process receiving a request from the main application via the asynchronous connection, the one or more synchronous operations at the target application through the second synchronous connection, wherein performance of the one or more synchronous operations by the first thread blocks progress of the main application and performance of the one or more synchronous operations by the second thread does not block progress of the main application; and terminating the first synchronous connection after the assistant process is initialized and a unit of communication between the main application and the target application is completed.

2. The method of claim 1, wherein the target application is at least one of the following: a database application at the computing device, an application for rendering images at the computing device, an application for accessing, transferring, or downloading a file, or an application for performing numerical computations.

3. The method of claim 1, further comprising receiving, at the main application, a readiness notification from the assistant process after the assistant process is initialized.

4. The method of claim 1, wherein the computing device is a mobile, portable device.

5. The method of claim 1, wherein the main application is single-threaded.

6. The method of claim 1, wherein the one or more synchronous operations include populating, from a local database at the computing device, an inbox folder of an email service.

7. The method of claim 6, wherein performing, by the assistant process, the one or more synchronous operations comprises:

retrieving data from the local database through the asynchronous connection in response to the request; and
returning a response to the main application.

8. The method of claim 7, further comprising:

determining, by the main application, whether the response includes requested data, the requested data being data requested by the main application;
if the response includes the requested data, updating, by the main application, the user interface using the requested data;
if the response does not include the requested data:
sending, by the main application, a data request to a remote server application;
receiving, by the main application, the requested data from the remote server application;
updating, by the main application, the user interface using the requested data; and
sending, by the main application, a data update request to the assistant process, the data update request including the requested data.

9. A computer system comprising:

one or more processors;
memory; and
one or more programs stored in the memory and configured to be executed by the one or more processors, the one or more programs including instructions for:
initializing a main application on a first thread, wherein the main application has a first synchronous connection with a target application, wherein initialization of the main application includes displaying a user interface;
initializing an assistant process on a second thread, wherein a start of the second thread is deferred until after the first thread has performed one or more synchronous operations at the target application through the first synchronous connection, the assistant process having an asynchronous connection to the main application and the assistant process having a second synchronous connection to the target application; and performing, by the assistant process in response to the assistant process receiving a request from the main application, via the asynchronous connection, the one or more synchronous operations at the target application through the second synchronous connection, wherein performance of the one or more synchronous operations by the first thread blocks progress of the main application and performance of the one or more synchronous operations by the second thread does not block progress of the main application; and terminating the first synchronous connection after the assistant process is initialized and a unit of communication between the main application and the target application is completed.

10. The computer system of claim 9, wherein the target application is at least one of the following: a database application at the computing device, an application for rendering images at the computing device, an application for accessing, transferring, or downloading a file, or an application for performing numerical computations.

11. The computer system of claim 9, wherein the one or more programs further include instructions for receiving, at the main application, a readiness notification from the assistant process after the assistant process is initialized.

12. The computer system of claim 9, wherein the computer system is a mobile, portable device.

13. The computer system of claim 9, wherein the one or more synchronous operations include populating, from a local database at the computing device, an inbox folder of an email service.

14. The computer system of claim 13, wherein the instructions for performing, by the assistant process, the one or more synchronous operations comprise instructions for:

retrieving data from the local database through the asynchronous connection in response to the request; and
returning a response to the main application.

15. A non-transitory computer-readable storage medium that stores computer-executable instructions that, when executed configure a computing device to:

initialize a main application on a first thread, wherein the main application has a first synchronous connection with a target application, wherein initialization of the main application includes displaying a user interface;
initialize an assistant process on a second thread, wherein a start of the second thread is deferred until after the first thread has performed one or more synchronous operations at the target application through the first synchronous connection, the assistant process having an asynchronous connection to the main application and the assistant process having a second synchronous connection to the target application; and
perform, by the assistant process in response to the assistant process receiving a request from the main application via the asynchronous connection, the one or more synchronous operations at the target application through the second synchronous connection, wherein performance of the one or more synchronous operations by the first thread blocks progress of the main application and performance of the one or more synchronous operations by the second thread does not block progress of the main application; and
terminate the first synchronous connection after the assistant process is initialized and a unit of communication between the main application and the target application is completed.

16. The computer-readable storage medium of claim 15, wherein the target application is at least one of the following: a database application at the computing device, an application for rendering images at the computing device, an application for accessing, transferring, or downloading a file, or an application for performing numerical computations.

17. The computer-readable storage medium of claim 15, wherein the one or more programs further include instructions for receiving, at the main application, a readiness notification from the assistant process after the assistant process is initialized.

\* \* \* \* \*